US010975328B2

(12) United States Patent
Long et al.

(10) Patent No.: US 10,975,328 B2
(45) Date of Patent: *Apr. 13, 2021

(54) METHODS FOR MAKING FREE FATTY ACIDS AND FATTY ACID DERIVATIVES FROM MIXED LIPID FEEDSTOCKS OR SOAPSTOCKS

(71) Applicant: Inventure Renewables, Inc., Tuscaloosa, AL (US)

(72) Inventors: Ryan Alexander Long, Northport, AL (US); Nathan Killingsworth, Northport, AL (US); Cory O'Neil Blanchard, Birmingham, AL (US)

(73) Assignee: Inventure Renewables, Inc., Bessemer, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,167

(22) Filed: Mar. 11, 2020

(65) Prior Publication Data
US 2020/0224121 A1 Jul. 16, 2020

Related U.S. Application Data

(63) Continuation of application No. PCT/US2019/060146, filed on Nov. 6, 2019.
(Continued)

(51) Int. Cl.
*C11B 13/02* (2006.01)
*C11B 3/00* (2006.01)
*C11B 3/04* (2006.01)

(52) U.S. Cl.
CPC .............. *C11B 13/02* (2013.01); *C11B 3/001* (2013.01); *C11B 3/003* (2013.01); *C11B 3/04* (2013.01)

(58) Field of Classification Search
CPC . C11B 13/02; C11B 3/001; C11B 3/04; C11B 3/003
See application file for complete search history.

(56) References Cited

U.S. PATENT DOCUMENTS 2,033,732 A   3/1936   Neiss
2,139,589 A   12/1938  Ittner
(Continued)

FOREIGN PATENT DOCUMENTS

CN   101565654 A   10/2009
CN   103992883     8/2014
(Continued)

OTHER PUBLICATIONS

Akiya, Naoko, et al., "Roles of Water for Chemical Reactions in High-Temperature Water", Chem. Rev., vol. 102, (2002), pp. 2725-2750.
(Continued)

*Primary Examiner* — Yate' K Cutliff
(74) *Attorney, Agent, or Firm* — Greer, Burns & Crain, Ltd.; Gregory P. Einhorn

(57) ABSTRACT

Provided are methods and systems for treating a soapstock. Provided are systems and methods for treating a soapstock to generate free fatty acids and/or fatty acid derivatives, and for realizing the full fatty acid yield of a soapstock by first converting substantially all of the saponifiable material in a soapstock to fatty acids and acidulating the soaps to generate free fatty acids and/or fatty acid derivatives, wherein the soapstock comprises soaps and saponifiable lipids, and the generating of free fatty acids is achieved. Provided are systems and methods for realizing the full fatty acid yield of a soapstock by first converting substantially all of the saponifiable material in a soapstock to salts of fatty acids and acidulating the soaps to generate free fatty acids and/or fatty acid derivatives, wherein the soapstock comprises soaps and
(Continued)

saponifiable lipids, and the generating of free fatty acids is achieved.

34 Claims, 5 Drawing Sheets

Related U.S. Application Data

(60) Provisional application No. 62/756,455, filed on Nov. 6, 2018.

(56) References Cited

U.S. PATENT DOCUMENTS

| | | | |
|---|---|---|---|
| 2,812,343 | A | 11/1957 | Cox et al. |
| 3,425,938 | A | 2/1969 | Bloomberg et al. |
| 3,428,660 | A | 2/1969 | Morren |
| 3,901,869 | A | 8/1975 | Bills |
| 4,075,188 | A | 2/1978 | Vardell, Jr. |
| 4,100,181 | A | 7/1978 | Phillips et al. |
| 4,118,407 | A | 10/1978 | Red et al. |
| 5,164,480 | A | 11/1992 | Huibers et al. |
| 5,210,242 | A | 5/1993 | Asbeck et al. |
| 5,283,319 | A | 2/1994 | Huibers et al. |
| 5,487,817 | A | 1/1996 | Fizet |
| 6,471,844 | B1 | 10/2002 | Samuels et al. |
| 6,475,758 | B2 | 11/2002 | Reaney |
| 6,855,838 | B2 | 2/2005 | Haas et al. |
| 7,705,170 | B2 | 4/2010 | Geier et al. |
| 8,426,622 | B2 * | 4/2013 | Kempers ............... C11B 13/02 435/132 |
| 9,546,342 | B1 * | 1/2017 | Sutterlin ............. B01D 61/025 |
| 2005/0255174 | A1 | 11/2005 | Shelley et al. |
| 2016/0201010 | A1 | 7/2016 | Berry et al. |
| 2016/0207879 | A1 | 7/2016 | Berry et al. |

FOREIGN PATENT DOCUMENTS

| | | |
|---|---|---|
| EP | 0 160 326 A1 | 12/1984 |
| EP | 0406945 A2 | 1/1991 |
| WO | 199323132 A2 | 11/1993 |
| WO | 2005095565 A2 | 10/2005 |
| WO | 2009017957 A1 | 2/2009 |
| WO | 2016100944 A2 | 6/2016 |
| WO | WO2018/048935 A1 * | 3/2018 ............. C11B 13/02 |

OTHER PUBLICATIONS

Beal, R.E., et al., "Treatment of Soybean Oil Soapstock to Reduce Pollution", Journal of the American Oil Chemists' Society, vol. 49, May 19, 1972, pp. 447-450.
Dayton, Christopher Lore Gene, et al., "Enzymatic Degumming", Green Vegetable Oil Processing (2014), pp. 107-146.
Deng, Qi, et al., "Study on Saponification Technology of Waste Edible Oil", 2009 3rd International Conference on Bioinformatics and Biomedical Engineering, (2009), 4 pages.
Dowd, Michael, K., "Gas chromatographic characterization of soapstocks from vegetable oil refining", Journal of Chromatography A, vol. 816, (1998), pp. 185-193.
Dumont, Marie-Josée, et al., "Characterization of soapstock and deodorizer distillates of vegetable oils using gas chromatography", Lipid Technology, vol. 20, No. 6, (Jun. 2008), pp. 136-138.
Dumont, Marie-Josée, et al., "Soapstock and deodorizer distillates from North American vegetable oils: Review on their characterization, extraction and utilization", Food Research International, vol. 40, (2007), pp. 957-974.
Echim, Camelia, et al., "Production of biodiesel from side-stream refining products", Energy Environ. Sci., vol. 2, (2009), pp. 1131-1141.
Haas, Michael, J., et al., "Simple, High-Efficiency Synthesis of Fatty Acid Methyl Esters from Soapstock", JAOCS, vol. 77, No. 4, (2000), pp. 373-379.
Haas, Michael, J., et al., "Engine Performance of Biodiesel Fuel Prepared from Soybean Soapstock: A High Quality Renewable Fuel Produced from a Waste Feedstock", Energy & Fuels, vol. 15, (2001), pp. 1207-1212.
Haas, Michael, J., Improving the economics of biodiesel production through the use of low value lipids as feedstocks: vegetable oil soapstock, Fuel Processing Technology, vol. 86, (2005), pp. 1087-1096.
Hangx, S.J.T., "Subsurface Mineralisation: Rate of CO2 Mineralisation and Geomechanical Effects on Host and Seal Formations, Behaviour of the CO2-H2O system and preliminary mineralisation model and experiments" Tech. Utrecht University: HPT Laboratory, Department of Earth Sciences, CATO-CO2 capture, transport and storage towards a clean use of fossil fuels in the energy economy, CATO Workpackage WP 4.1, (Dec. 2005), 43 pages.
Jin, B., et al., "Comprehensive utilization of the mixture of oil sediments and soapstocks for producing FAME and phosphatides", Fuel Processing Technology, vol. 89, (2008), pp. 77-82.
Kulkarni, B.M., et al., "Investigation of Acid Oil as a Source of Biodiesel", Indian Journal of Chemical Technology, vol. 15, (Sep. 2008), pp. 467-471.
Santos, Regiane Ribeiro Dos, "Characterization of Different Oil Soapstocks and Their Application in the Lipase Production by Aspergillus niger under Solid State Fermentation" Journal of Food and Nutrition Research, vol. 2, No. 9, (2014), pp. 561-566.
Solvay, BicarZ, "Sodium Bicarbonate" Downloaded on Apr. 15, 2015, 3 pages.
United States Department of Agriculture, "Tall Oil Technical Evaluation Report", Jan. 31, 2010, 13 pages.
Watanabe, Yomi, et al., "Enzymatic Production of Fatty Acid Methyl Esters by Hydrolysis of Acid Oil Followed by Esterification", J Am Oil Chem Soc, vol. 84, (2007), pp. 1015-1021.
Woerfel, J.B., et al., "Processing and Utilization of By-Products from Soy Oil Processing", JAOCS, vol. 58, Issue 3, (Mar. 1981), pp. 188-191.
Woerfel, J.B., et al. "Alternatives for Processing of Soapstock", JAOCS, vol. 60, No. 2, (Feb. 1983), pp. 262A-265A.
Young, Written Opinion and International Search Report for PCT/US2013/050321, dated Nov. 16, 2017.
Compound Interest "Food, Cosmetics & Explosives—The versatility of Glycerol" May 25, 2014 p. 1.
Medlineplus "Calcium Carbonate" Sep. 15, 2015 p. 1.
Libretexts "Electrolysis" Feb. 9. 2014 p. 1.
Office Action for corresponding Eurasian Patent Application No. 201990666 dated Feb. 19, 2020.

* cited by examiner

METHODS FOR MAKING FREE FATTY ACIDS AND FATTY ACID DERIVATIVES FROM MIXED LIPID FEEDSTOCKS OR SOAPSTOCKS

RELATED APPLICATIONS

This U.S. Utility Patent Application is a continuation of Patent Convention Treaty (PCT) International Application No. PCT/US2019/060146, filed Nov. 6, 2019, now pending, which, claims the benefit of priority under 35 U.S.C. § 119(e) of U.S. Provisional Application Ser. No. 62/756,455 filed Nov. 6, 2018. The aforementioned applications are expressly incorporated herein by reference in their entirety and for all purposes.

TECHNICAL FIELD

The present invention generally provides processes for treating a mixed lipid feedstock or soapstock and making free fatty acids. Provided are systems and methods for treating a mixed lipid feedstock or soapstock or any composition comprising a mixture of triglycerides of fatty acids to generate free fatty acids and/or fatty acid derivatives, e.g. fatty acid alkyl esters such as fatty acid methyl esters. Provided are systems and methods for realizing the full fatty acid yield of a mixed lipid feedstock or soapstock by first acidulating soaps in the mixed lipid feedstock or soapstock to generate free fatty acids and/or fatty acid derivatives, e.g. fatty acid alkyl esters. In alternative embodiments, the mixed lipid feedstock or soapstock comprises a soap or any saponifiable lipid, e.g. glycerides, triglycerides and/or phospholipids, and the generating of free fatty acids and/or fatty acid is achieved. In alternative embodiments, the reaction products of the acidulation reaction are thermally hydrolyzed. In alternative embodiments, free fatty acids and fatty acid derivatives produced using processes as provided herein are used as a novel feedstock to the renewable diesel industry.

BACKGROUND

Crude (unrefined) animal and vegetable oils (referred to herein collectively as "natural oils") are typically subjected to a variety of processing steps to remove specific undesirable components of the crude oil prior to sale. The type, number, and sequencing of processing steps can vary depending on the crude oil feedstock, refinery type (e.g. physical vs. alkaline) and configuration, target product markets, and the like. In general, crude natural oils are refined to remove excess quantities of "gums" (comprised primarily of phospholipids), free fatty acids, as well as various coloring components and volatile compounds.

Once removed from the crude oil, the refining byproducts are either sold directly into low-value markets such as animal feed, or further processed into higher-value products. Two major byproducts of the chemical refining processes of natural oils are soapstock and gums. In most natural oil refineries utilizing the chemical refining process, phosphoric acid or an equivalent acid is added to the crude oil to increase the solubility of the phospholipids (gums) in water. Next, a strong base, typically sodium hydroxide (NaOH) is added, reacting with the free fatty acids in the oil to form soaps (salts of free fatty acids). Water is then added to the oil to remove the soaps and solubilized gums. Soapstock is typically acidulated to generate free fatty acids. Gums are typically sold into low-value animal feed markets or upgraded to food-grade emulsifiers, e.g. lecithin.

In most chemical refining configurations, additional waste streams are generated which represent low- or negative-value byproducts. For example, it typically necessary to perform an additional water wash on the oil after the majority of the gums and soaps have been removed. The lipid content of this washwater (referred to as Soapstock Makeup) can contain from about 5% to about 20% soaps and other lipids, but the lipid content is generally not sufficiently high to justify the costs of further processing into value added products. In addition, all of the above referenced byproduct streams from the chemical refining process contain various amounts of saponifiable (triglyceride-comprising) material that are not converted to free fatty acids.

SUMMARY

In alternative embodiments, provided are methods and processes for generating, and isolating or purifying, free fatty acids from a mixed lipid feedstock, the method comprising:

(a) providing a first mixture comprising an aqueous solution or mixture comprising a mixed lipid feedstock, and wherein optionally the mixed lipid feedstock comprises: a soapstock; a triglyceride comprising material; a saponifiable material, optionally a glyceride or a phospholipid; a tall oil, optionally a "liquid rosin" tall oil, a soapstock; a gums product, optionally a chemically or enzymatically derived gums product; a crude biodiesel; a fatty acid, optionally from a distillation bottom; a fat splitter emulsion, optionally purged from fat splitter due to accumulation when recycled; or, any combination thereof, and optionally the mixed lipid feedstock comprises a soapstock, a wash-water comprising soaps or a combination thereof, optionally generated during the chemical refining of a crude natural oil, and optionally the mixed lipid feedstock comprises a mixture of fatty acid soaps, fatty acids or fatty acid soaps and fatty acids, wherein optionally the mixture is generated via a fermentation process or reaction, and optionally the mixed lipid feedstock comprises a biological source, optionally including plants (including agricultural products or waste-products) and microorganisms, such as, for example, an algae (such as a kelp) or a yeast, and optionally the mixed lipid feedstock is derived from a biomass, a crude natural oil, or a plant or an animal source, optionally a tallow;

and optionally the mixed lipid feedstock is derived from enzymatic degumming of edible and inedible oils, and optionally the mixed lipid feedstock is pretreated; and (b) acidifying (or acidification of) the mixed lipid feedstock to generate free fatty acids from soaps by a process comprising:

(1) providing an acid or an acid solution or a gas capable of forming an acid when mixed with water,
wherein optionally the acid or an acid solution comprises a carbon dioxide ($CO_2$) or a stack gas; and (2) combining or mixing the first mixture with the acid or acid solution or the gas, optionally $CO_2$ or a stack gas, to have an acidulation reaction and to generate a second mixture comprising free fatty acids, wherein the first mixture is combined or mixed with the acid or acid solution or the gas, optionally $CO_2$ or a stack gas, for a sufficient amount of time to acidulate, optionally partially acidulate, or substantially acidulate all of, the soap in the first reaction mixture to generate free fatty acids from the soaps, and optionally the pH of the acidulation reaction mixture is less than about pH 5, or is between about pH 1 to pH 6, or is about pH 1, 2, 3, 4, 5 or 6, and optionally the amount of the gas is sufficient to increase the pressure of the reaction mixture, optionally in a reaction vessel, in which the acidulation reaction is being carried out to between about 0 and about 5000 psig, and optionally a solvent is added to the acidulation reaction in an amount of between about 0.01:1 solvent-to-total dissolved solids (TDS) present in the mixed lipid feedstock to about 100:1 TDS, or about 10:1 TDS; and (c) forming and then separating a lipid phase or a lipid component from the first reaction mixture, wherein optionally the lipid phase or the lipid component is formed by allowing the reaction products of the acidulation reaction to settle or partition away from (e.g., substantially most of) the non-lipid component of the reaction products of the acidulation reaction, and optionally the separated lipid phase or a lipid component comprises a small percentage of unreacted soaps (wherein optionally a small percentage is between about 0.01% and 15%, or is between about 1% and 10%, or is about 0.5%, 1%, 2%, 3%, 4% or 5% or more), wherein optionally the unreacted soaps comprise soaps that were not acidulated to generate free fatty acids, and optionally the soaps that were not acidulated to generate free fatty acids comprise from between about 0.01 wt % and 70 wt %, or between about 1 wt % and 60 wt %, or between about 5 wt % and 50 wt %, or between about 10 wt % and 40 wt %, or about 10, 15, 20, 25, 30, 35, 40, 45 or more wt %, of the lipid phase or the lipid component, and optionally, once the majority of fatty acids are removed, the soap-containing residue is recycled back in the process upstream of separation so as to re-split certain components and/or to acidulate the soaps to fatty acids, thereby substantially isolating or purifying free fatty acids from a mixed lipid feedstock.

In alternative embodiments, of methods and processes as provided herein:

the method or process further comprises a thermal hydrolysis reaction for hydrolyzing the mixed lipid feedstock before the acidulation reaction, wherein optionally the thermal hydrolysis reaction of the mixed lipid feedstock takes place after the acidification reaction, or optionally the thermal hydrolysis reaction of the mixed lipid feedstock takes place before the acidification reaction, or optionally the thermal hydrolysis reaction of the mixed lipid feedstock takes places during the acidification reaction, wherein the thermal hydrolysis reaction comprises:

heating and pressurizing the aqueous solution or mixture comprising the mixed lipid feedstock under conditions comprising sufficient pressure and temperature to generate a first reaction mixture comprising a free fatty acid and/or a soap (a fatty acid salt), and/or a glyceride, wherein optionally the glyceride comprises a monoacylglycerol (MAG), a diacylglycerol (DAG), a triacylglycerol (TAG), or a combination thereof, wherein the thermal hydrolysis reaction is carried out under conditions comprising:

a temperature in the range of between about 10° C. to about 700° C., or about 20° C. to about 600° C., or about 50° C. to about 500° C., a pressure of between about 300 to about 2000 psig (about 20.7 bar to about 137.9 bar) or a pressure of between about 0 to about 2500 psig, and reacting for between about 1 second (sec) to about 3000 minutes (min), or between about 1 min to about 300 min, or between about 5 min to 200 min, and optionally the amount of water in the thermal hydrolysis reaction is between about 0.1:1 or 0.2:1 water-to-total dissolved solids (TDS) present in the mixed lipid feedstock to about 15:1 TDS, or about 10:1 TDS; or between about 1:1 TDS present in the mixed lipid feedstock to about 100:1 TDS, and optionally a solvent is added to the thermal hydrolysis reaction in an amount of between about 0.01:1 solvent-to-total dissolved solids (TDS) present in the mixed lipid feedstock to about 100:1 TDS, or about 10:1 TDS, and optionally the thermal hydrolysis reaction comprises use of one or more reagents capable of generating acids once hydrolyzed, wherein optionally the reagent is or comprises a saccharide;

the method or process further comprises a lipase reaction for hydrolyzing the mixed lipid feedstock before the acidulation reaction, wherein optionally the lipase reaction of the mixed lipid feedstock takes place after the acidification reaction, or optionally the lipase reaction of the mixed lipid feedstock takes place before the acidification reaction, or optionally the lipase reaction of the mixed lipid feedstock takes places during the acidification reaction, wherein the lipase reaction comprises:

heating and pressurizing the aqueous solution or mixture comprising the mixed lipid feedstock under conditions comprising sufficient pressure and temperature to generate a first reaction mixture comprising a free fatty acid and/or a soap (a fatty acid salt), and/or a glyceride, wherein optionally the glyceride comprises a monoacylglycerol (MAG), a diacylglycerol (DAG), a triacylglycerol (TAG), or a combination thereof, wherein the lipase reaction is carried out under conditions comprising:

a temperature in the range of between about 10° C. to about 700° C., or about 20° C. to about 600° C., or about 50° C. to about 500° C., a pressure of between about 300 to about 2000 psig (about 20.7 bar to about 137.9 bar) or a pressure of between about 0 to about 2500 psig, and reacting for between about 1 second (sec) to about 24 days, or between about 1 min to about 7 days, or between about 5 min to 1 day, and optionally the amount of water in the lipase reaction is between about 0.1:1 or 0.2:1 water-to-total dissolved solids (TDS) present in the mixed lipid feedstock to about 15:1 TDS, or about 10:1 TDS; or between about 1:1 TDS present in the mixed lipid feedstock to about 100:1 TDS, and optionally a solvent is added to the lipase reaction in an amount of between about 0.01:1 water-to-total dissolved solids (TDS) present in the mixed lipid feedstock to about 100:1 TDS, or about 10:1 TDS, and optionally the lipase reaction comprises use of one or more reagents capable of generating acids in situ via fermentation, wherein optionally the reagent is or comprises a saccharide;

the mixed lipid feedstock comprises a saponifiable material, and the saponifiable material is subjected to a saponification reaction before the acidulation reaction, wherein optionally the saponifiable material comprises glycerides and/or phospholipids, and optionally the saponification reaction is carried out under conditions comprising:

a temperature in the range of between about 10° C. to about 600° C., or in a range of between about 40° C. to 200° C., or about 60° C. to 150° C., or about 75° C. to 120° C., a pressure of between about 0 to 2000 psig, between about 1 and 1000 psig, between about 2 and 500 psig, between about 3 and 250 psig, between about 4 and 150 psig, or between about 5 psig and 50 psig, or is carried out at ambient pressure, and/or a reaction time of between about 1 second and 1440 minutes, e.g. between about 1 and 700 minutes, or between about 5 and 500 minutes, or between about 120 minutes and 360 minutes, and optionally the amount of water in the saponification reaction is between about 0.01:1 water-to-total dissolved solids (TDS) present in the feedstock to about 100:1, e.g. about 10:1, and optionally a solvent is added to the lipase reaction in an amount of between about 0.01:1 water-to-total dissolved solids (TDS) present in the mixed lipid feedstock to about 100:1 TDS, or about 10:1 TDS;

the method or process further comprises separating the free fatty acids from the separated lipid phase or lipid component by utilizing an apparatus or device capable of separating the free fatty acids from the separated lipid phase or lipid component, wherein optionally the apparatus or device comprises a distillation unit, apparatus or device or equivalent, wherein optionally the distillation unit, apparatus or device or equivalent for separating the free fatty acids from the separated lipid phase or lipid component comprises a distillation column, a flash vessel, an evaporative unit (wherein optionally the evaporative unit comprises a wiped film evaporator), a crystallizer, or a chromatography unit, and optionally the separating of the free fatty acids from the separated lipid phase or lipid component using the apparatus capable of distillation or equivalent results in removing about 70%, 75%, 80%, 85%, 90%, 95%, 98%, 99% or more of the free fatty acids, and optionally, the fatty acids recovered from the separation unit undergo one or a plurality of additional processing steps, wherein optionally the additional processing steps comprise fractional distillation, crystallization, adsorption or chromatography, and optionally water in the lipid phase is removed (or substantially removed) prior to entering the apparatus or device or separation unit, and optionally water in the lipid phase is removed inside of the same apparatus or device or separation unit that removes the fatty acids, and optionally the methods further comprise additional evaporative steps or measures to recover volatile components to increase overall recovery of total fatty matter, and optionally the volatile components comprise residual fatty acids or monoglycerides;

the method or process further comprises recycling at least a portion of the soap-containing lipid phase that was generated after the recovery of fatty acids from the separated lipid phase so as to increase the overall conversion of soaps to fatty acids, wherein optionally, at least a portion of the soap-containing lipid phase can be recycled back to any number of places of the process, and optionally the at least a portion of the soap-containing lipid phase is between about 0.5% to 30%, about between 1% to 25%, or about between 2% to 20%, of the soap-containing lipid phase, and optionally, the amount of the recycle stream to be recycled back to the process is between about 0.01 wt % and 99.9 wt % of the soap-containing lipid phase, with the amount of the purge stream leaving the system being the remainder of what is not recycled back to the process, and optionally, the purge stream leaving the system may be subjected to any number of steps of separation so as to increase the value of one or more of these compounds;

the method or process further comprises:

(a) reacting the fatty acids generated from any part of the process with an alcohol or alcohols to form a reaction mixture comprising fatty acid alkyl esters and/or glycerides, wherein optionally the mixing is done under conditions comprising between about 20° C. to about 350° C., or 200° C. to 400° C., and a pressure of between about 0 psi to about 3000 psi, or 1500 psi to 2000 psi, and optionally one or more organic and/or inorganic catalysts are used to aid in the formation of fatty acid alkyl esters and/or glycerides, and optionally one or more enzymes are used to aid in the formation of (or to catalyze the formation of) fatty acid alkyl esters and/or glycerides, and optionally substantially all of the free fatty acids are esterified to generate fatty acid alkyl esters and/or glycerides, optionally, fatty acid methyl esters or tripalmitin, and optionally the alcohol comprises methanol, ethanol or a mixture thereof;

the method or process further comprises: separating, isolating, and/or purifying the free fatty acids and/or the fatty acid alkyl esters into separate fractions, and optionally, if there are soaps remaining in the lipid phase following the acidulation step, and it is desired to not fully convert all the soaps to fatty acids, then fatty acids are removed from the other components of the lipid phase via a separation process, wherein optionally the separation process comprises distillation, crystallization or chromatography;

the pretreatment acidification reaction step comprises:

(1)

(i) providing an acid or an acid solution or a gas capable of forming an acid when mixed with water, optionally a carbon dioxide ($CO_2$) or a stack gas; and (ii) combining or mixing the mixed lipid feedstock with the acid or acid solution or the gas, optionally $CO_2$, or mixing the mixed lipid feedstock with the acid or acid solution or the gas, optionally $CO_2$, to have an acidulation reaction and to generate a pre-treated mixed lipid feedstock, wherein the mixed lipid feedstock is combined or mixed with the acid or acid solution or the gas, optionally $CO_2$, for a sufficient amount of time to acidulate, optionally partially, or substantially all of, the soap in the mixed lipid feedstock; or (2) electrolysis, optionally using a hydrogen evolving cathode (HEC) electrolysis unit, of the mixed lipid feedstock for a sufficient amount of time to acidulate, optionally partially, or substantially all of, the soap in the mixed lipid feedstock, and optionally the pH of the pre-treatment acidulation reaction mixture is less than about pH 5, or is between about pH 1 to pH 6, or is about pH 1, 2, 3, 4, 5 or 6, and optionally the amount of the gas is sufficient to increase the pressure of the pre-treatment reaction mixture, optionally in a reaction vessel, in which the pre-treatment acidulation reaction is being carried out to between about 0 and about 5000 psig;

the natural oil or crude natural oil comprises a vegetable oil, wherein optionally the vegetable oil comprises a soybean oil, a canola oil, a rapeseed oil, a corn oil, a rice oil, a sunflower oil, a peanut oil, a sesame oil, a palm oil, an algae oil, a jatropha oil, a castor oil, a safflower oil, a grape seed oil or any combination thereof, and optionally the natural oil or crude natural oil comprises castor oil, and optionally a free fatty acid generated is ricinoleic acid (12-hydroxy-9-cis-octadecenoic acid);

the mixed lipid feedstock further comprises additional water, a phospholipid and/or an unsaponifiable material;

the acid or acid solution comprises carbonic acid, and optionally the carbonic acid is generated by adding carbon dioxide ($CO_2$) to the first reaction mixture, thereby causing the carbon dioxide to react with water in the first reaction mixture to form carbonic acid, and optionally a source of the carbon dioxide ($CO_2$) comprises a stack gas or a flue gas, or a gaseous $CO_2$ emitted from an industrial process or an oven, a furnace, a boiler, a steam generator, a coal fired power plant, an ethanol plant, a brewery, or an industrial process wherein a gaseous waste stream comprising $CO_2$ is emitted, and optionally the carbon dioxide is added to the first reaction mixture, optionally as a liquid, a carbon dioxide gas, or as a gaseous flow of carbon dioxide into the reaction vessel;

the heating and pressurizing of the mixed lipid feedstock is done in a single vessel, or sequential, different, reaction vessels; and optionally the pre-treatment and the thermal hydrolysis are done in a single reaction vessel, and optionally the pre-treatment, the thermal hydrolysis and the post-thermal hydrolysis acidulation are done in the same reaction vessel;

the soapstock is obtained from the alkaline neutralization of a crude natural oil; the gums product comprises phospholipids, and optionally the gums product is generated during the degumming of a natural oil; or the mixed lipid feedstock comprises, or further comprises, one or more compounds produced as a byproduct from the water washing of crude biodiesel, wherein optionally the compounds comprise soapstock, monoglycerides, diglycerides, triglycerides and/or fatty acid alkyl esters or any combination thereof;

the method is a batch or a continuous process;

the heating and pressurizing the mixed lipid feedstock takes place in conditions comprising: temperature in a range of between about 100° C. to 500° C., or 200° C. to 400° C., or 240° C. to 300° C., or at about 260° C.; and/or a pressure of between about 650 and 750 psig, between about 750 and 850 psig, between about 850 and 1000 psig, between about 1000 and 1500 psig, or between about 1500 psig and 1800 psig; and/or for between about 20 and 30 minutes, or between about 160 and 180 minutes, or between about 300 minutes and 500 minutes;

the amount of gas is sufficient to increase the pressure of the reaction mixture, optionally in a reaction vessel, in which the acidulation reaction is being carried out to between about 10 and 1000 psig, about 20 to about 600 psig, about 30 to about 500 psig, about 40 to about 400 psig, about 50 to about 300 psig, about 60 to about 200 psig, about 60 to about 150 psig, about 70 to about 140 psig, about 80 to about 120 psig, about 90 to about 110 psig, or about 100 psig;

the acidulation reaction is carried out at a temperature in the range of between about 5° C. to about 400° C., e.g. about 10° C. to about 90° C., about 15° C. to about 70° C., about 20° C. to about 60° C., or about 25° C. to about 40° C.;

the acid or acid solution comprises an organic and/or an inorganic acid or a mineral acid, a hydrochloric acid, a sulfuric acid, a formic acid or sodium bisulfate, and optionally when a stack gas comprising $N_2O$, $NO_x$, optionally $NO_2$, $SO_x$, optionally $SO_2$, or $H_2S$ is used the $N_2O$, $NO_x$, $SO_x$, or $H_2S$ reacts with water in the acidulation reaction mixture to form equivalent aqueous acid species, and optionally the organic acid is generated in situ by thermal hydrolysis of one or multiple reagents, wherein optionally the one or multiple reagents is or comprises a saccharide, and optionally the organic acid is generated by fermentation of one or multiple reagents, wherein optionally the one or multiple reagents is or comprises a saccharide;

wherein after a reaction vessel has reached a desired temperature and pressure to carry out the acidulation step, the resulting reaction mixture is agitated, or otherwise mixed in order to maximize the contacting of the soaps with the acid, and optionally carbonic acid, and optionally the mixture, can be agitated using a spinning blade mixer, and optionally the mixture is agitated for between about 10 minutes to about 200 minutes, e.g. between about 25 minutes to about 150 minutes, or between about 20 minutes to about 60 minutes, or about 30 minutes.

after the acidulation reaction, and optionally following an agitation step, the contents of the acidulation reaction, optionally in a reaction vessel, are allowed to settle or partition allowing for the formation or separation of a lipid layer, a lipid phase or a lipid component, and an aqueous layer, an aqueous phase or an aqueous component, wherein the lipid layer or lipid phase floats on the top of the aqueous layer, and optionally the lipid layer or lipid phase comprises free fatty acids and any non-acidulated soaps, and the aqueous layer comprises water, glycerol, phosphate salts, bicarbonate, carbonate or other equivalent salts, unsaponifiable material, optionally waxes and sterols, and dissolved carbonic acid;

before or after the reaction products of the acidulation reaction, optionally in a reaction vessel, are allowed to settle or partition, the reaction products of the acidulation step are transferred to a separation vessel, optionally a decanter, a settler or an equivalent, or a centrifuge where the lipid layer or lipid phase or component separates or partitions out from an aqueous phase or component; or the acidulation product mixture is not transferred to a separate vessel in order to separate lipids in the lipid layer or lipid phase from reaction products in an aqueous phase or component, and after the lipid layer or lipid phase or component separates or partitions out from the aqueous phase or component the aqueous layer is drained from the bottom of the reaction vessel and the lipid layer or the lipid phase or component is recovered as the reaction product;

the method or process further comprises multiple acidulation reactions, optionally between about 1 and 20 additional acidulation reactions, or about 1, 2, 3, 4, 5, 6, 7 or 8 or more additional acidulation reactions;

the method or process comprises depressurizing the reaction vessel after the acidulation reaction, and allowing for dissolved carbonic acid or other gaseous acid to separate out of the solution as gaseous $CO_2$, or equivalents, and optionally captured $CO_2$ is recycled for use in the further acidulation reactions;

wherein the solvent added to the thermal hydrolysis reaction is a polar, optionally a methanol, or a non-polar, optionally a hexane, solvent;

the thermal hydrolysis reaction and the acidulation reaction take place sequentially; or, the thermal hydrolysis reaction and the acidulation reaction can take place simultaneously as a "one pot" reaction in one reaction vessel;

the lipid layer or lipid phase or component, optionally comprising unreacted soaps, is transferred to an electrolysis unit, optionally a hydrogen evolving cathode (HEC) electrolysis unit, wherein the lipid layer or lipid phase or component is reacted with an anolyte such that the unreacted soaps generate free fatty acids, and optionally the electrolysis step converts substantially all, or about 90%, 95%, 98% or more of the unreacted soaps to free fatty acids, wherein optionally the anode comprises a mixed metal oxide (MMO) layer coated onto a stable metal substrate, optionally a titanium, and optionally the anolyte comprises a sodium or potassium sulfate, a sodium or potassium nitrate, or a sodium or potassium chloride;

the lipid layer or lipid phase or component is transferred to an electrolysis unit, optionally a hydrogen evolving cathode (HEC) electrolysis unit, comprising a vessel or suitable container comprising an anode, optionally an anode vessel, and a vessel or other suitable container comprising a cathode, optionally a cathode vessel, separated by a selective filtration membrane, optionally a polytetrafluoroethylene (PTFE) membrane, wherein optionally the anode comprises a mixed metal oxide (MMO) layer coated onto a stable metal substrate, optionally a titanium, and optionally the cathode comprises a titanium or a Monel alloy, or any substrate that is stable in a reducing environment;

the aqueous phase or component, or multiple aqueous phases if collected from multiple acidulation reactions, is treated to remove water, wherein optionally the treatment of the aqueous phase or component to remove water is by a drying method, optionally evaporation via falling film, forced recirculation flashing or equivalent, thereby generating a product comprising salts, and optionally the product is dried further to generate a sodium bicarbonate and/or sodium carbonate product, or equivalents, that is substantially free of any water, optionally less than about 20% water or less than about 10% water, and optionally the drying is done using a fluidized bed dryer, a lyophilizer, a spray dryer, or a rotary drum dryer;

the aqueous phase or component, or multiple aqueous phases if collected from multiple acidulation reactions, is treated using a filtration, optionally a membrane filtration system, a nano- or microfiltration system or a size-exclusion filtration system, and optionally the filtration is operationally in-line operating continuously with the acidulation step such that aqueous phase generated in the acidulation reaction, or each acidulation reaction if more than one acidulation reaction, is treated immediately after or during the point at which the aqueous phase is separated from the lipid phase, and optionally the aqueous phase is collected and treated in a single batch, and optionally soaps and/or other saponifiable material rejected by the filtration, optionally soaps and/or other saponifiable material that do not pass through a membrane of a filter system, are returned to the lipid layer or lipid phase or component for subsequent acidulation reactions, thereby increasing the overall fatty acid yield;

the aqueous phase or component, or multiple aqueous phases if collected from multiple acidulation reactions, is treated with calcium hydroxide, optionally a slaked lime, to form a calcium precipitate, optionally a calcium phosphate ($Ca_x(PO_4)_x$) precipitate, and optionally the lime-treated aqueous phase or component, or multiple aqueous phases if collected from multiple acidulation reactions, is subjected to an oxidation step, optionally a Fenton oxidation wherein hydrogen peroxide and $Fe^I$ ions are used to catalyze OH radical formation;

the aqueous phase or component, or multiple aqueous phases if collected from multiple acidulation reactions, is subjected to electrolysis to recover monovalent ions as a base for a value added product, wherein electrical current is passed through a cathode, the water is reduced, thereby generating hydroxide ions; and as monovalent ions, optionally sodium or potassium, are pushed across a membrane separating an anode vessel from a cathode vessel into the cathode vessel, they react with the generated hydroxide ions to generate a corresponding hydroxide base, optionally a sodium hydroxide or a potassium hydroxide, and optionally the hydroxide base separated out, recovered and/or isolated;

the mixed lipid feedstock is pretreated by one or more reagents (wherein optionally the one or more reagents comprise pretreatment reagents), techniques or methods; and optionally the pretreatment reagents comprise salts, bases, oxidizers, reductants; retreatment techniques and/or methods comprising mixing, emulsifying, diluting, concentrating, sterilizing, adding a solvent, adjusting pH, adjusting temperature or any combination thereof; and/or any part of the process is batch, semi-batch and/or continuous.

In alternative embodiments, provided are uses of a fatty acid or a fatty acid derivative generated from a method or process of any of the preceding claims for the manufacture of a renewable diesel (HVO, HEFA) and/or a biodiesel and/or an oleochemical, wherein optionally the fatty acid or fatty acid derivative is first converted to a glyceride and/or an ester prior to the production of the renewable diesel (HVO, HEFA) and/or the biodiesel and/or the oleochemical, wherein optionally the fatty acid or fatty acid derivative is pretreated to remove impurities that would interfere with the production of the renewable diesel and/or the biodiesel and/or the oleochemical.

In alternative embodiments, provided are method or processes for the manufacture of a renewable diesel (HVO, HEFA) and/or biodiesel and/or oleochemicals comprising use of a method or process of any of the preceding claims, wherein optionally the fatty acid or fatty acid derivative is first converted to a glyceride and/or an ester prior to the production of the renewable diesel (HVO, HEFA) and/or the biodiesel and/or the oleochemical, wherein optionally the fatty acid or fatty acid derivative is pretreated to remove impurities that would interfere with the production of the renewable diesel and/or the biodiesel and/or the oleochemical.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

All publications, patents, patent applications cited herein are hereby expressly incorporated by reference for all purposes.

BRIEF DESCRIPTION OF THE DRAWINGS

The drawings set forth herein are illustrative of exemplary embodiments provided herein and are not meant to limit the scope of the invention as encompassed by the claims.

Like reference symbols in the various drawings indicate like elements.

Figure 1:
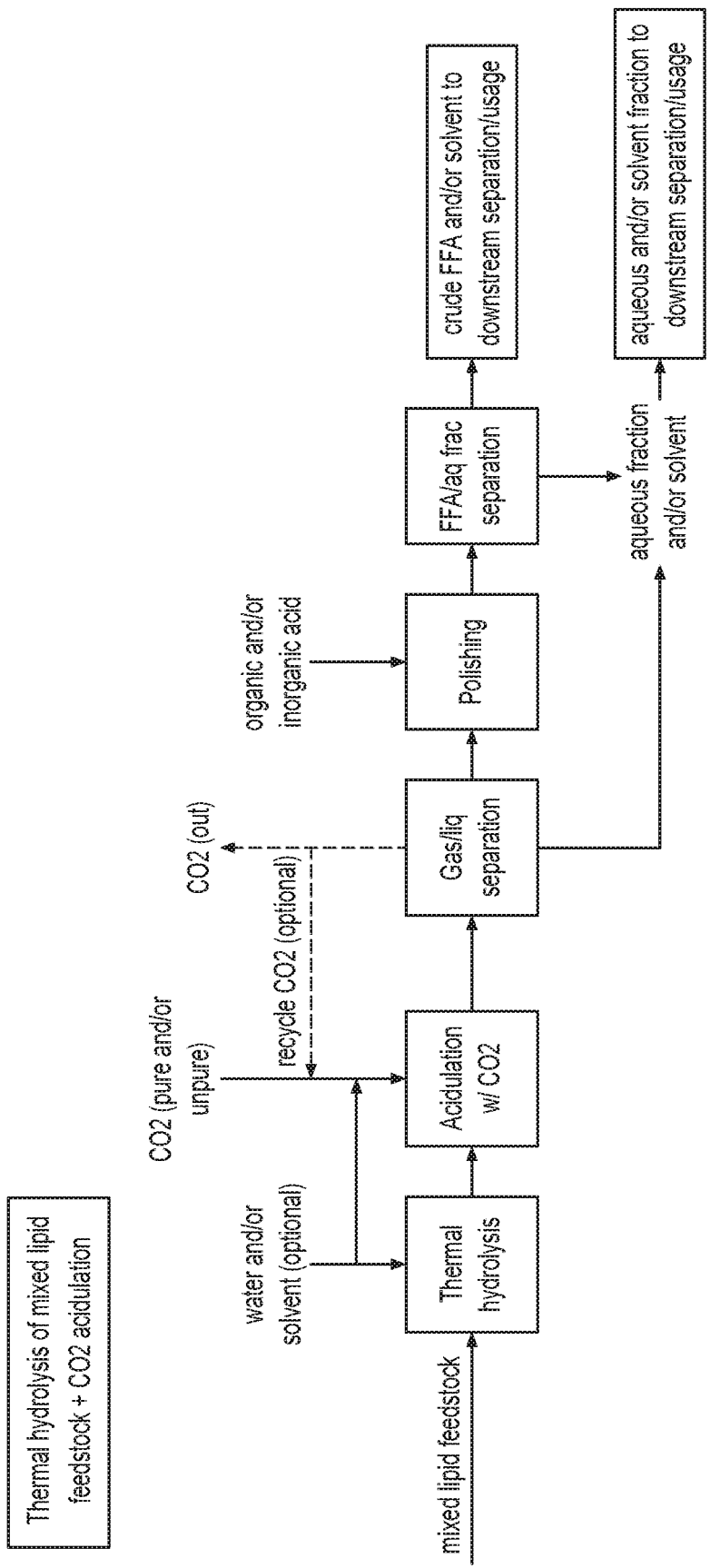
FIG. 1 is a flow diagram of an exemplary method as provided herein comprising generating free fatty acids from a mixed lipid feedstock comprising soaps, saponifiable material or equivalents thereof comprising use of thermal hydrolysis followed by acidulation with $CO_2$.
Figure 2:
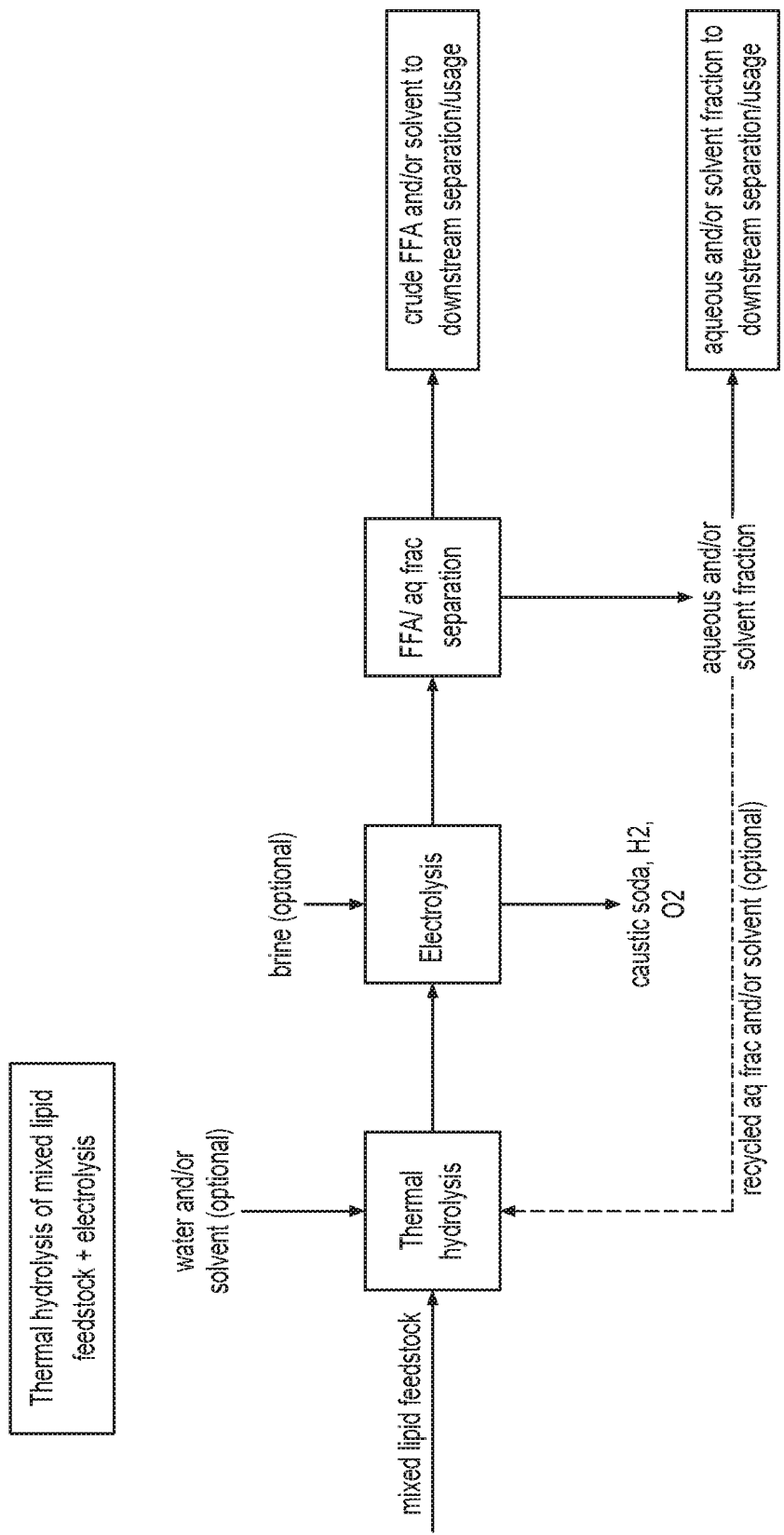
FIG. 2 is a flow diagram of an exemplary method as provided herein comprising generating free fatty acids from a mixed lipid feedstock comprising soaps, saponifiable material or equivalents thereof comprising use of thermal hydrolysis followed by electrolysis.
Figure 3:
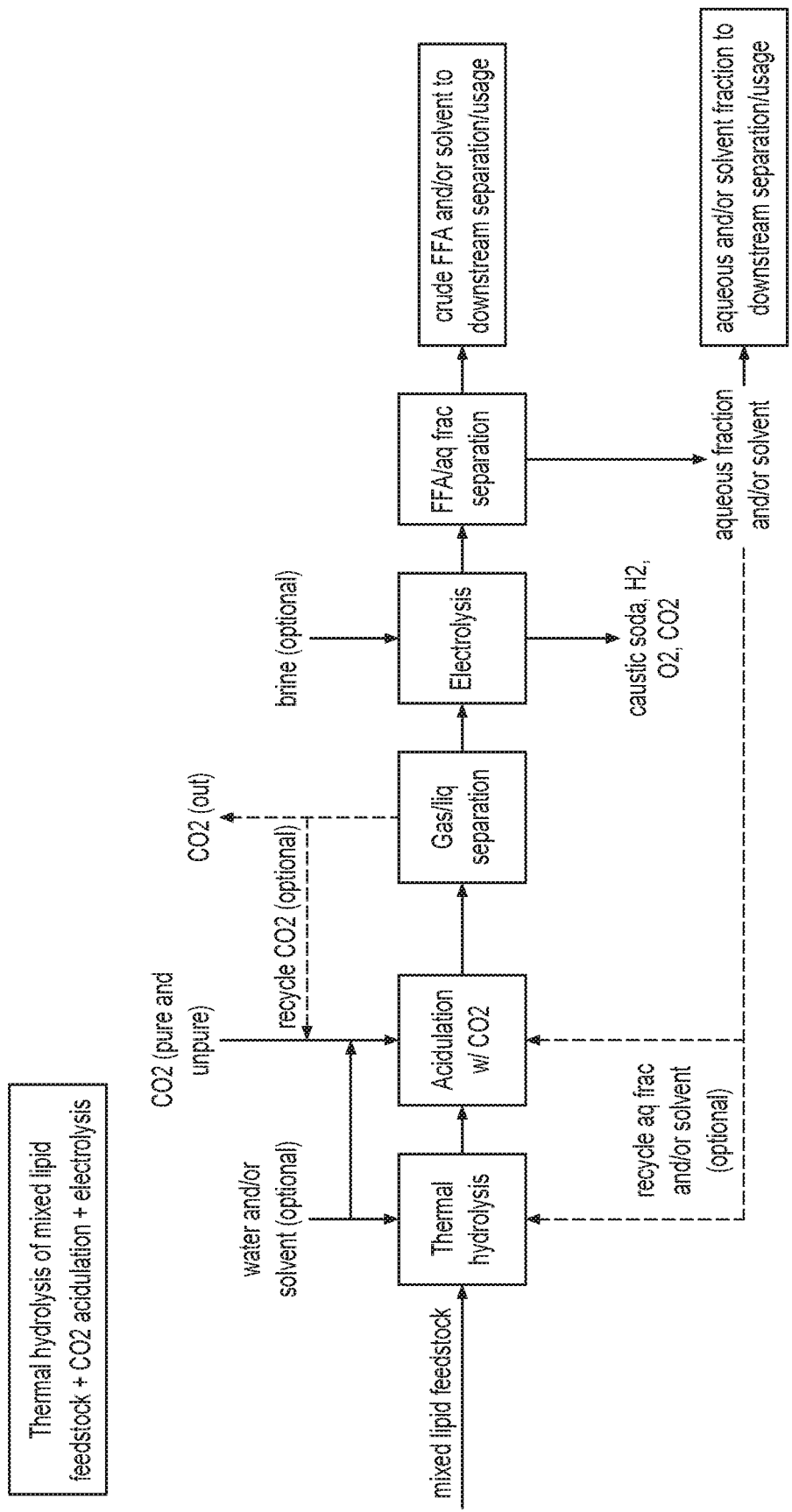
FIG. 3 is a flow diagram of an exemplary method as provided herein comprising generating free fatty acids from a mixed lipid feedstock comprising soaps, saponifiable material or equivalents thereof comprising the use of thermal hydrolysis, followed by acidulation with $CO_2$, and then electrolysis.
Figure 4:
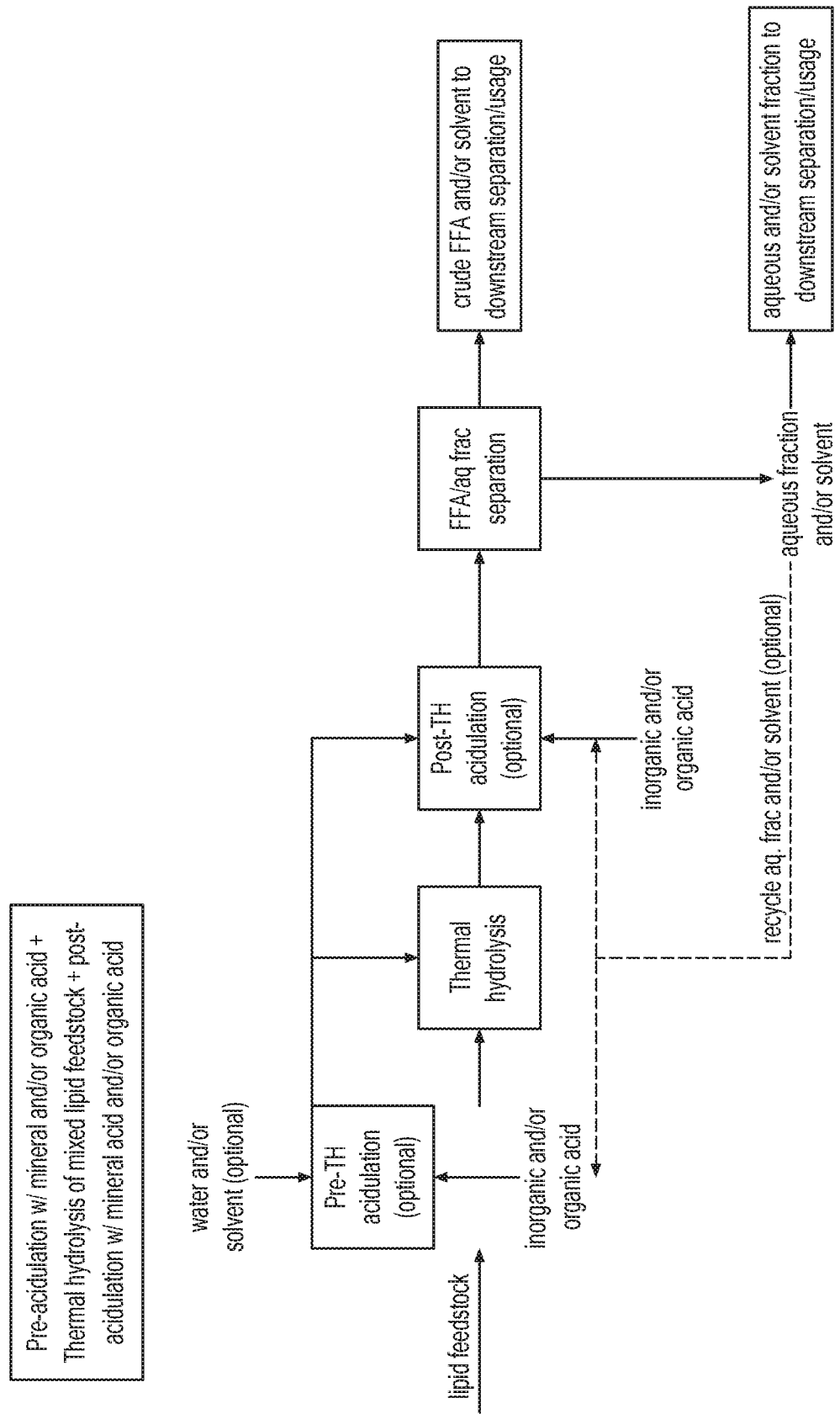
FIG. 4 is a flow diagram of an exemplary method as provided herein comprising generating free fatty acids from a mixed lipid feedstock comprising soaps, saponifiable material or equivalents thereof, the method comprising the use of acidulation with an organic and/or mineral add prior to thermal hydrolysis thermal hydrolysis is performed followed by acidulation with the mineral and/or organic acid.
Figure 5:
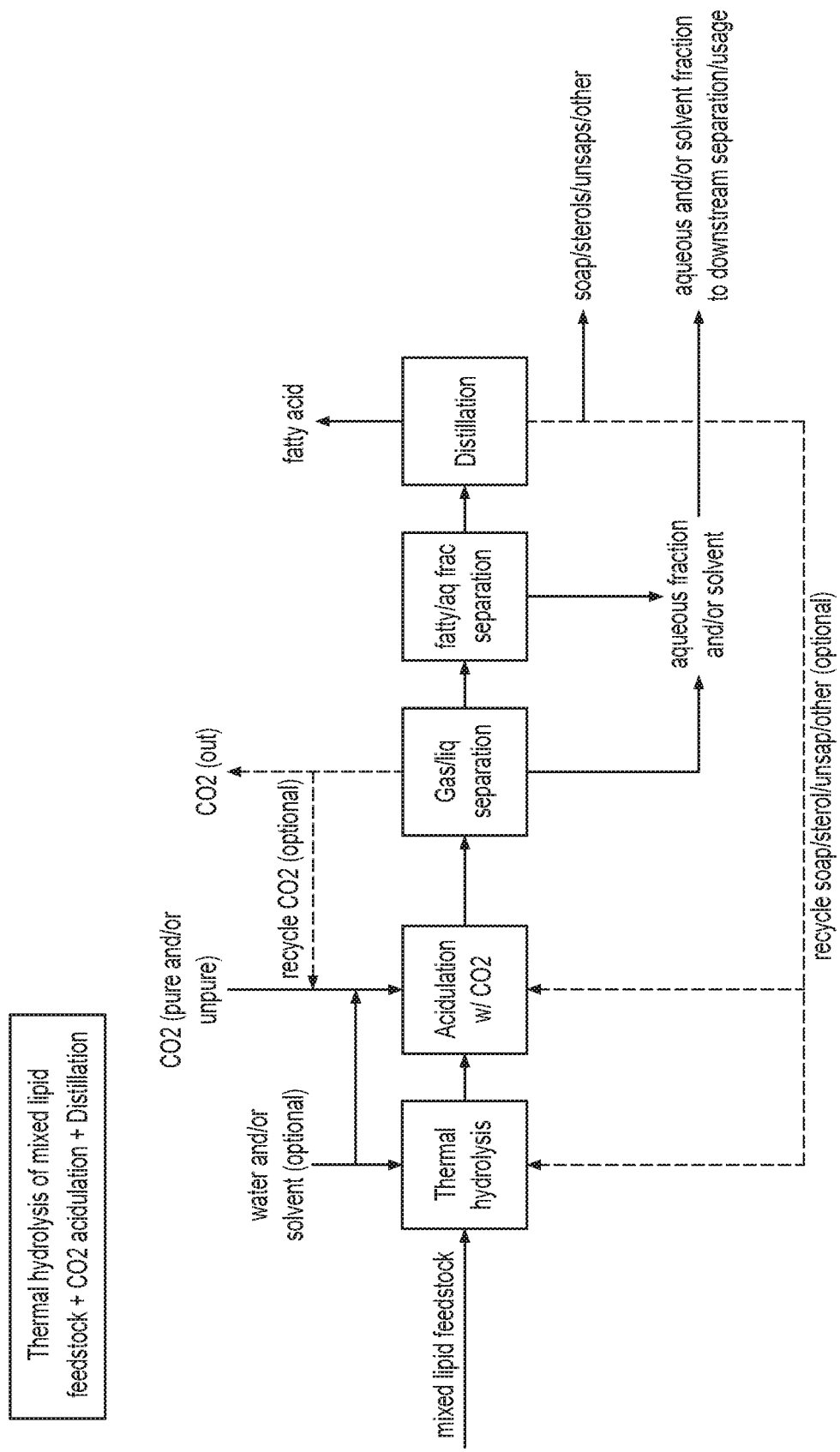
FIG. 5 is a flow diagram of an exemplary method as provided herein comprising generating distilled fatty acids from a mixed lipid feedstock comprising soaps, saponifiable material or equivalents thereof, the method comprising the use of thermal hydrolysis, followed by acidulation with $CO_2$, and then distillation of fatty acids from the remainder of components.

Reference will now be made in detail to various exemplary embodiments of the invention. The following detailed description is provided to give the reader a better understanding of certain details of aspects and embodiments of the invention, and should not be interpreted as a limitation on the scope of the invention.

DETAILED DESCRIPTION

In alternative embodiments, provided are methods, systems and processes for the preparation of fatty acids and optionally fatty acid derivatives, e.g. fatty acid alkyl esters, from mixed lipid feedstocks comprising saponifiable material or any triglyceride comprising material, including byproduct streams of natural oil processing e.g. soapstocks, gums, or mixtures thereof. In alternative embodiments, the feedstock comprises soapstock obtained from the alkaline neutralization of a crude natural oil. In alternative embodiments, the feedstock comprises the gums product (comprising primarily phospholipids) generated during the degumming of a natural oil. In alternative embodiments, the feedstock comprises a mixture of product streams generated during the processing of a crude natural oil and comprises soaps as well as saponifiable lipids, e.g. phospholipids. glycerides, e.g. mono-, di-, and/or triglycerides, or any combination thereof.

In alternate embodiments, the mixed lipid feedstock comprises a mixture of soapstock and monoglycerides produced as a byproduct from the water washing of crude biodiesel.

In alternative embodiments, the mixed lipid feedstock comprises a mixture of fatty acid soaps, fatty acids or fatty acid soaps and fatty acids generated by fermentation of the mixed lipid feedstock.

In alternative embodiments, the mixed lipid feedstock comprises a biological source, including plants (including agricultural products or waste-products) and microorganisms, such as, for example, an algae (such as a kelp) or a yeast.

In alternative embodiments, the mixed lipid feedstock comprises streams generated from an oil refinery utilizing enzymatic degumming, for example, where free fatty acids and phospholipids or phosphatides (by degumming) are removed from a crude oil.

In alternative embodiments, before the acidulation and/or the thermal hydrolysis reaction, the mixed lipid feedstock is pretreated by one or more reagents, techniques or methods. Pretreatment reagents can comprise salts, bases, oxidizers, reductants or any combination thereof. Pretreatment techniques or methods can comprise mixing, emulsifying, diluting, concentrating, sterilizing, adding a solvent, adjusting pH, adjusting temperature and the like or any combination thereof.

In alternative embodiments, processes and methods as provided herein are more economical and efficient than currently used approaches for the treatment of natural oil processing byproducts, e.g., soapstocks and gums, to generate fatty acids, fatty acid derivatives, or other value-added products.

In alternative embodiments, a mixed lipid feedstock, e.g., comprising a soapstock comprising soaps and/or a saponifiable material (e.g., glycerides and/or phospholipids) is first acidulated. In alternative embodiments, the acidulation reaction is followed by a thermal hydrolysis, thereby generating a product in which substantially all of the free fatty acids are cleaved from their respective glycerol backbones or phosphate groups.

In alternative embodiments, a mixed lipid feedstock, e.g., comprising a soapstock comprising soaps and/or a saponifiable material (e.g., glycerides such as triglycerides and/or phospholipids) is first thermally hydrolyzed. In alternative embodiments, the thermal hydrolysis is followed by an acidulation reaction, thereby generating a product in which substantially all of the free fatty acids are cleaved from their respective glycerol backbones or phosphate groups. In alternative embodiments, the thermal hydrolysis occurs simultaneously with an acidulation reaction.

In alternative embodiments, a mixed lipid feedstock, e.g., comprising a soapstock comprising soaps and/or a saponifiable material (e.g., glycerides and/or phospholipids) is first saponified (for example, the mixed lipid feedstock is subjected to saponification before the acidulation and/or the thermal hydrolysis reaction). In alternative embodiments, the saponification is followed by an acidulation reaction, thereby generating a product in which substantially all of the free fatty acids are cleaved from their respective glycerol backbones or phosphate groups.

In alternative embodiments, a mixed lipid feedstock, e.g., comprising a soapstock comprising soaps and/or a saponifiable material (e.g., glycerides and/or phospholipids) is first subjected to lipolysis (for example, the mixed lipid feedstock is subjected to lipolysis before the acidulation and/or the thermal hydrolysis reaction).

In alternative embodiments, the lipolysis is followed by an acidulation reaction, thereby generating a product in which substantially all of the free fatty acids are cleaved from their respective glycerol backbones or phosphate groups. In alternative embodiments, the lipolysis occurs simultaneously to an acidulation reaction.

In alternative embodiments, the soaps or a soapstock present in a feedstock stream are reacted with an acid in the acidulation step of the process, in which optionally substantially all of the soaps are acidulated to form free fatty acids. If there are soaps remaining in the lipid phase following the acidulation step, and it is desired to not fully convert all the soaps to fatty acids, then fatty acids can be removed from the other components of the lipid phase via any choice of separation, or combination of separation methods, known in the art, e.g., distillation, crystallization, chromatography, etc. In alternative embodiments, once the majority of fatty acids are removed, the soap-containing residue can be recycled back in the process upstream of separation so as to re-split certain components and/or to acidulate the soaps to fatty acids. This isolation technique can be useful in concentrating valuable components in the residue, for example, sterols and oryzanol.

In alternative embodiments, the soaps or a soapstock present in a product stream generated in a thermal hydrolysis step are reacted with an acid in the acidulation step of the process, in which optionally substantially all of the soaps are acidulated to form free fatty acids and fatty acid derivatives. If there are soaps remaining in the lipid phase following the acidulation step, and it is desired to not fully convert all the soaps to fatty acids, then fatty acids and fatty acid derivatives can be removed from the other components of the lipid phase via any choice of separation processes, or combination of separation processes, known in the art, e.g., distillation, crystallization, chromatography, etc. Once the majority of fatty acids are removed, then the soap-containing residue can be recycled back in the process upstream of separation so as to re-split certain components and/or to acidulate the soaps to fatty acids. This isolation technique can be useful in concentrating valuable components in the residue, like sterols and oryzanol.

In alternative embodiments, the soaps or a soapstock present in a feedstock stream are reacted with an acid during a thermal hydrolysis step of the process so as to create a combined acidulation/hydrolysis step of the process, in which optionally substantially all of the soaps are acidulated to form free fatty acids and fatty acid derivatives. If there are soaps remaining in the lipid phase following the combined acidulation/hydrolysis step, and it is desired to not fully convert all the soaps to fatty acids, then fatty acids and fatty acid derivatives can be removed from the other components of the lipid phase via any choice of separation processes, or combination of separation processes, known in the art, e.g., distillation, crystallization, chromatography, etc. Once the majority of fatty acids and fatty acid derivatives are removed, then the soap-containing residue can be recycled back in the process upstream of separation so as to re-split certain components and/or to acidulate the soaps to fatty acids. This isolation technique can be useful in concentrating valuable components in the residue, like sterols and oryzanol.

In alternative embodiments, the soaps or a soapstock present in a feedstock stream are reacted with an acid during a thermal hydrolysis step of the process so as to create a combined acidulation/hydrolysis step of the process, in which optionally substantially all of the soaps are acidulated to form free fatty acids and fatty acid derivatives. If there are soaps remaining in the lipid phase following the combined acidulation/hydrolysis step, and it is desired to not fully convert all the soaps to fatty acids, then fatty acids and fatty acid derivatives can be removed from the other components of the lipid phase via any choice of separation processes, or combination of separation processes, known in the art, e.g., distillation, crystallization, chromatography, etc. Once the majority of fatty acids and fatty acid derivatives are removed, then the soap-containing residue can be recycled back in the process upstream of separation so as to re-split certain components and/or to acidulate the soaps to fatty acids. This isolation technique can be useful in concentrating valuable components in the residue, like sterols and oryzanol.

In alternative embodiments, fatty acids and fatty acid derivatives recovered are used as feedstock for production of renewable/green diesel, including renewable diesel known as "HVO" (hydrotreated vegetable oil) and "HEFA" (hydroprocessed esters and fatty acids), and "Paraffinic Diesel Fuel from Hydrotreatment" using the European standard definition for EN 15940. The general process for producing renewable diesel involves catalysts that hydrogenate alkene moieties and decarboxylate and/or decarbonylate carboxylic acid moieties of fatty acids to generate alkane profiles similar to those in petroleum-based diesel. In alternative embodiments, fatty acids and fatty acid derivatives produced using methods as provided herein are used in renewable diesel production processes, for example, including: Vegan, ECOFINING™, Hydroflex, NEXBTL, UPM BioVerno, etc.); and, the fatty acids produced using methods as provided herein can either be used as-is or are first be converted to glycerides via glycerolysis before entering the catalytic hydrogenation/decarboxylation/decarbonylation section of those processes. Depending on the purity of the fatty acids recovered from processes as provided herein, some pretreatment, e.g. bleaching, of the fatty acids must occur prior to their catalytic upgrading to renewable diesel.

In alternative embodiments, prior to sale for human consumption or for further processing, a crude natural oil is refined to remove the majority of the non-triglyceride components. The majority of natural oils can be refined using a chemical refining process. In the first stage of the chemical refining process, referred to as "degumming", crude oils are first washed with water to remove the hydratable phospholipids (gums). The resulting product stream separated from the oil during the degumming step is referred to as "gums." Second, the degummed oils are subjected to a neutralization step in which the degummed oil is treated with a strong base, e.g. sodium hydroxide. During the neutralization step, free fatty acids present in the oil react with the base to form soaps (salts of fatty acids). In alternative embodiments an additional processing step between the degumming and neutralization step is used in which a small amount of a mineral acid, e.g. phosphoric acid or citric acid, is added to the degummed oil to convert any non-hydratable phospholipids into hydrated phospholipids. After the neutralization step, the oil is washed to remove the soaps and, if the oil was treated with a mineral acid, the hydrated phospholipids. The resulting product stream separated from the oil during the neutralization step is referred to as "soapstock." If the oil is to be sold for human consumption, the degummed, neutralized oil is then subjected to further processing including, e.g. bleaching and deodorization steps.

Alternatively, in the production of biodiesel used to practice methods provided herein, a lipid mixture is generated as a byproduct. In the production of biodiesel, fatty acids are esterified by several means including by enzymatic reaction, acid/base reactions, supercritical alcohol, and/or ultrasonically. The reaction generates water, which in turn back reacts with the esters to generate monoglycerides and free fatty acids. The removal of these impurities is achieved by water and/or base washing the crude biodiesel. The washing generates a lipid mixture product of soap, water, and/or monoglycerides, which is regarded as a waste stream in the process of biodiesel refining. This subsequent soapstock can be utilized in the thermal hydrolysis process provided herein producing high yield free fatty acids as a value added product for the biodiesel processors.

In alternative embodiments, the configuration of the refinery varies, and soapstock and gums can be either stored separately or combined into a single storage container. In alternative embodiments, a "mixed lipid feedstock" refers to any material or composition comprising soaps as well saponifiable material, i.e. lipids capable of reacting to produce soaps (salts of fatty acids). Saponifiable material in the mixed lipid feedstock can include, without limitation, glycerides, e.g. mono-glycerides, di-glycerides, or triglycerides, or a combination thereof, and/or phospholipids. In alternative embodiments, the mixed lipid feedstock is a soapstock. In alternative embodiments, the mixed lipid feedstock comprises soaps and saponifiable lipids e.g. glycerides and/or phospholipids. In alternative embodiments, the mixed lipid feedstock is a mixture of soapstocks, comprising soaps, saponifiable material, e.g. glycerides and/or phospholipids, obtained during the processing of a natural oil. In alternative embodiments, the mixed lipid feedstock is a soapstock washwater obtained from the processing of a crude natural oil following the neutralization step in the chemical refining process. In such embodiments, the washwater can comprise water and soapstock, wherein the soapstock comprises soaps, glycerides, phospholipids, free fatty acids, and unsaponifiable material e.g. waxes and/or sterols. In alternative embodiments, the soapstock washwater can comprise between about 1% soapstock to about 100% soapstock, e.g. between about 2% and 80% soapstock, about 3% and 70% soapstock, about 4% and about 60% soapstock, about 5% and about 50% soapstock, about 6% and about 40% soapstock, about 7% and about 30% soapstock, about 8% and about 20% soapstock, about 9% and about 15% soapstock, or between about 20% and about 12% soapstock, the remaining portion of the soapstock washwater comprising water.

In alternative embodiments, the composition of the soapstock used as a mixed lipid feedstock can vary depending on the crude natural oil from which it was derived. Table 1 shows the composition of various soapstocks used to practice methods and processes as provided herein, e.g., as described in U.S. Pat. No. 4,118,407.

TABLE 1

Composition of soapstocks from the refining of various natural oils

| Composition | Soybean | Cottonseed | Coconut | Palm Kernel | Palm |
|---|---|---|---|---|---|
| Water | 57.3 | 58.6 | 66.8 | 57.8 | 66.4 |
| Neutral Oil | 14.6 | 13.0 | 17.4 | 26.2 | 8.4 |
| FFA | 1.46 | 0.94 | 0.55 | 0.24 | 1.25 |
| Unsaponifiable | 1.1 | 1.4 | 0.85 | 0.38 | 0.2 |
| Soap | 14.2 | 17.5 | 14.4 | 14.2 | 23.8 |
| Phosphatide | 11.34 | 8.56 | 0 | 0 | 0 |
| Phosphorus | 0.8 | 0.38 | 0.16 | 0 | 0 |
| Total FFA | 23.7 | 27.6 | 27.3 | 38.1 | 21.9 |
| pH | 9.5 | 9.5 | 9.2 | 9.2 | 10.8 |

Other mixed lipid feedstocks suitable for use in methods and processes as provided herein comprises tall oil soaps. Tall oil soaps are generated via the alkaline pulping of wood in the Kraft process. The alkaline pulping of wood using the Kraft process results in the production of black liquor, comprising the majority of the non-cellulose components of the wood. These products include hemicelluloses, lignin, and various salts of carboxylic acids including rosin salts and soaps (salts of fatty acids). After the black liquor is concentrated using multiple effect evaporators, it is allowed to settle or is centrifuged. As the concentrated black liquor settles, the soaps float to the surface where they are skimmed and removed. The skimmed product (referred to as black liquor soaps or tall oil soaps) can be used as a feedstock in various embodiments of processes and methods as provided herein.

In alternative embodiments, the mixed lipid feedstock used to practice methods and processes as provided herein comprises a saponified crude natural oil, e.g. a saponified vegetable oil. In alternative embodiments, the mixed lipid feed feedstock is a saponified castor oil, i.e. a composition comprising soaps derived from mixing a base with a castor oil, the saponifiable content in the castor oil, e.g. glycerides, and phospholipids, having been converted to soaps. The majority of the fatty acid content in castor oil (e.g. between 80 to about 95% of the fatty acid content) is ricinoleic acid (12-hydroxy-9-cis-octadecenoic acid). In alternative embodiments, provided are methods or processes for generating ricinoleic acid by thermal hydrolysis, acidulating the saponified castor oil to generate free fatty acids, and then separating or isolating ricinoleic acid from the generated free fatty acids.

Alternative embodiments of the methods and processes are described in greater detail below.

Thermal Hydrolysis:

In alternative embodiments, in thermal hydrolysis processes as provided herein, the mixed lipid feedstock is hydrolyzed and the reaction is driven by heat and pressure. The reaction mechanism includes the hydroxyl ion attacking the carbonyl group(s), or ester(s), present in mixed lipid feedstocks in the form of triglycerides, and/or phospholipids. When full reaction proceeds, the process yields fatty acids, glycerol, and other non-fatty acid solids due to the inherent nature of soapstock.

In alternative embodiments, the second stage of the process, after the acidulation of the feedstock, comprises a thermal hydrolysis reaction with a mixed lipid feedstock. In alternative embodiments, the second stage of the process, after the acidulation of the feedstock, comprises a thermal hydrolysis reaction with a mixed lipid feedstock and a reagent capable of generating acids once hydrolyzed, i.e. saccharides. In alternative embodiments, the first stage of the process comprises a thermal hydrolysis reaction with a mixed lipid feedstock. In alternative embodiments, the first stage of the process comprises a thermal hydrolysis reaction with a mixed lipid feedstock and a reagent capable of generating acids once hydrolyzed, i.e. saccharides. In alternative embodiments, the thermal hydrolysis reaction can take place in any suitable reaction vessel known in the art. In alternative embodiments, the reaction can be a batch or continuous process, depending on the desired throughput of material from the reaction. In alternative embodiments, the process involves adding a mixed lipid feedstock to a reactor where thermal hydrolysis will occur.

In alternative embodiments, the thermal hydrolysis reaction is carried out at a temperature in the range of between about 20° C. to about 600° C., or in a range of between about 100° C. to 500° C., or about 200° C. to 400° C., or about 240° C. to 300° C., or at about 260° C. In alternative embodiments, the thermal hydrolysis reaction is carried out at a pressure of between about 500 to 2000 psig, between about 650 and 750 psig, between about 750 and 850 psig, between about 850 and 1000 psig, between about 1000 and 1500 psig, or between about 1500 psig and 1800 psig. In alternative embodiments, the thermal hydrolysis reaction is carried out at ambient pressure. In alternative embodiments, the time allotted for the reaction to occur is between about 1 minute and 300 minutes, e.g. between about 20 and 30 minutes, or between about 160 and 180 minutes, or between about 300 minutes and 500 minutes. In alternative embodiments, the amount of water in the thermal hydrolysis reaction is between about 0.1:1 or 0.2:1 water-to-total dissolved solids (TDS) present in the feedstock to about 15:1, e.g. about 10:1.

Saponification:

In alternative embodiments, in saponification processes as provided herein, the mixed lipid feedstock is saponified and the reaction is driven by heat and pressure. The reaction mechanism includes the hydroxyl ion attacking the carbonyl group(s), or ester(s), present in mixed lipid feedstocks in the form of triglycerides, and/or phospholipids. When full reaction proceeds, the process yields fatty acid soaps, glycerol, and other non-TFA solids due to the inherent nature of soapstock.

In alternative embodiments, the saponification reaction is carried out at a temperature in the range of between about 10° C. to about 600° C., or in a range of between about 40° C. to 200° C., or about 60° C. to 150° C., or about 75° C. to 120° C., or at about 90° C. In alternative embodiments, the saponification reaction is carried out at a pressure of between about 0 to 2000 psig (0 to 137.9 barg), between about 1 and 1000 psig, between about 2 and 500 psig, between about 3 and 250 psig, between about 4 and 150 psig, or between about 5 psig and 50 psig. In alternative embodiments, the saponification reaction is carried out at ambient pressure. In alternative embodiments, the time allotted for the reaction to occur is between about 1 second and 1440 minutes, or more, e.g. between about 1 and 700 minutes, or between about 5 and 500 minutes, or between about 120 minutes and 360 minutes. In alternative embodiments, the amount of water in the thermal hydrolysis reaction is between about 0.2:1, or about 15:1, water-to-total dissolved solids (TDS) present in the feedstock, or at about 10:1.

Lipolysis:

In alternative embodiments, in lipolysis processes as provided herein, the mixed lipid feedstock is subjected to lipolysis and the reaction is driven by heat, pressure and pH. n alternative embodiments, the reaction mechanism is completely or partially enzymatic in nature. In alternative embodiments, when a full reaction proceeds, the process yields fatty acids, glycerol, and other non-TFA solids due to the inherent nature of soapstock.

In alternative embodiments, the lipolysis reaction is carried out at a temperature in the range of between about 10° C. to about 600° C., or in a range of between about 40° C. to 200° C., or about 60° C. to 150° C., or about 75° C. to 120° C., or at about 90° C. In alternative embodiments, the lipolysis reaction is carried out at a pressure of between about 0 to 2000 psig (0 to 137.9 barg), between about 1 and 1000 psig, between about 2 and 500 psig, between about 3 and 250 psig, between about 4 and 150 psig, or between about 5 psig and 50 psig. In alternative embodiments, the lipolysis reaction is carried out at ambient pressure. In alternative embodiments, the time allotted for the reaction to occur is between about 1 second and 24 days, or more, e.g. between about 1 and 700 minutes, or between about 5 and 500 minutes, or between about 120 minutes and 360 minutes. In alternative embodiments, the amount of water in the thermal hydrolysis reaction is between about 0.2:1, or about 15:1, water-to-total dissolved solids (TDS) present in the feedstock, or at about 10:1.

Acidulation of Soaps:

In alternative embodiments, provided are methods for generating and isolating or purifying free fatty acids from a mixed lipid feedstock the method comprising: first, providing a first feedstock mixture comprising an aqueous solution or mixture comprising a mixed lipid feedstock, followed by acidifying (or acidification of) the mixed lipid feedstock to generate free fatty acids from soaps by a process comprising: (1) providing an acid or an acid solution or a gas (e.g., $CO_2$ or a stack gas) capable of forming an acid when mixed with water, and (2) combining or mixing the first feedstock mixture with the acid or acid solution or the gas, wherein the first feedstock mixture is combined or mixed with the acid or acid solution or the gas, optionally $CO_2$ or a stack gas, for a sufficient amount of time to acidulate the soap in the first feedstock mixture to generate free fatty acids from the soaps; optionally followed by forming or generating and then separating a lipid phase or a lipid component from the first reaction mixture.

In alternative embodiments, the fatty acids, or the reaction products generated during a thermal hydrolysis step, are subjected to an acidulation step in which most, or substantially all, of the remaining soaps are acidulated to generate free fatty acids. The soaps are acidulated by mixing them, in any suitable reaction vessel, e.g. the same reaction vessel that was used in the thermal hydrolysis step, with an acid to form an acidulation reaction mixture.

In alternative embodiments, the fatty acid soaps, or the reaction product generated during a saponification step, are subjected to an acidulation step in which most, or substantially all, of the remaining soaps are acidulated to generate free fatty acids. The soaps are acidulated by mixing them, in any suitable reaction vessel, e.g. the same reaction vessel that was used in the saponification step, with an acid to form an acidulation reaction mixture.

In alternative embodiments, the fatty acids, fatty acid soaps, or the reaction product generated during a saponification step, or the reaction product generated during a lipolysis step, are subjected to an acidulation step in which most, or substantially all, of the remaining soaps are acidulated to generate free fatty acids. The soaps are acidulated by mixing them, in any suitable reaction vessel, e.g. the same reaction vessel that was used in the lipolysis step, with an acid or gas capable of forming an acid to form an acidulation reaction mixture.

In alternative embodiments, the acid is either an organic or inorganic acid, e.g. carbonic acid, formic acid, acetic acid or equivalents. In alternative embodiments, organic acid is generated in situ by thermal hydrolysis of one or multiple reagents, e.g. saccharides. In alternative embodiments, organic acid is generated in situ by fermentation of one or multiple reagents, e.g. saccharides. In alternative embodiments, the acid originates from a waste or byproduct stream, optionally a fermentation broth, a refinery waste or a food waste. In alternative embodiments, carbonic acid is generated by mixing $CO_2$ with the thermal hydrolysis reaction product, wherein the $CO_2$ reacts with the water (present in the thermal hydrolysis reaction product) to form carbonic acid. In alternative embodiments, the $CO_2$ is a liquid or a gas or a combination thereof. In an exemplary embodiment, when the $CO_2$ is a gas, the $CO_2$ is then piped or otherwise directed into the reaction vessel wherein the $CO_2$ reacts with the water present in the thermal hydrolysis reaction product to form carbonic acid. Once formed, the carbonic acid reacts with the soaps, thereby acidulating them and generating free fatty acids and a corresponding salt, e.g. sodium bicarbonate.

The amount of $CO_2$ used in the acidulation step of alternative embodiments of the process can vary depending on, for example, ambient temperature and pressure conditions, but is generally sufficient to increase the pressure of the reaction vessel in which the acidulation reaction is being carried out to between about 0 and about 5000 psig (0 to 344.7 barg), e.g. between about 5 and about 2000 psig, about 10 and 1000 psig, about 20 to about 600 psig, about 30 to about 500 psig, about 40 to about 400 psig, about 50 to about 300 psig, about 60 to about 200 psig, about 60 to about 150 psig, about 70 to about 140 psig, about 80 to about 120 psig, about 90 to about 110 psig, or about 100 psig. In alternative embodiments, the acidulation reaction is carried out at a temperature in the range of between about 5° C. to about 400° C., e.g. about 10° C. to about 90° C., about 15° C. to about 70° C., about 20° C. to about 60° C., or about 25° C. to about 40° C.

In alternative embodiments, the source of the $CO_2$ used in the acidulation step is a "stack gas" or "flue gas" (used interchangeably herein and referred to as "stack gas") other source of gaseous $CO_2$ emitted from an industrial process or any oven, furnace, boiler, steam generator or the like, e.g. from a coal fired power plant, ethanol plant, brewery, or any other industrial process wherein a gaseous waste stream comprising $CO_2$ is emitted.

In alternative embodiments, the stack gas is piped or otherwise transferred from the emission source to the vessel in which the acidulation reaction is carried out. In alternative embodiments, the stack gas can comprise gaseous $CO_2$ and possibly other products depending on the filtration or other purification steps that the stack gas was subjected to prior to being transferred to the acidulation reactor. The exact composition of the stack gas will vary depending on the emission source and post-combustion processing steps but is generally comprised primarily of $CO_2$ (e.g. about 60% or more $CO_2$), nitrogenous products (e.g. $N_2O$ and $NO_2$), sulfur dioxide ($SO_2$), hydrogen sulfide ($H_2S$), water vapor and possibly other products.

In alternative embodiments, where a stack gas is used as the $CO_2$ source, other products in the stack gas, e.g. $N_2O$, $NO_2$, $SO_2$, $H_2S$ or the like can react with the water in the acidulation reaction mixture to form their equivalent aqueous acid species (e.g., $SO_2$ would react with the water to generate sulfuric acid). The generation of additional acid products in the reaction mixture can serve to increase the reaction efficiency and reduce the total amount of time required to perform the acidulation reaction. As such, the use of a stack gas "waste stream" may be beneficial in the process, representing an opportunity to utilize a waste stream from one industrial process to benefit another industrial process (which might otherwise require expensive processing steps prior to being emitted) as an input for the present process. The process therefore is a means of diverting what would otherwise be an environmental pollutant to an input stream of a separate industrial process.

In alternate embodiments, the $CO_2$ can be liquid from a bulk tank or truck. Other products may optionally be added to the acidulation reaction mixture e.g. organic or inorganic acids, e.g. formic acid or sodium bisulfate. The addition of additional acids can be useful in tailoring the ash profile of the resulting acidulation product mixture (the mixture of products resulting from the acidulation reaction) such that certain end products can be used as, e.g. a fertilizer. The optional addition of additional acids can serve to increase the reaction efficiency by acidulating soaps that were not acidulated by the carbonic acid.

In alternative embodiments, the desired pH of the acidulation reaction mixture is less than about pH 5, or is between about pH 1 to pH 6, or is about pH 1, 2, 3, 4, 5 or 6. In alternative embodiments, the amount of $CO_2$ and optional other acids (e.g. from stack gas) added to the acidulation reaction mixture is sufficient to reduce the pH of the mixture to below 5 or about 2 or 3.

In alternative embodiments, following the addition of the $CO_2$ (or stack gas, or carbonated water) and optional other acids to the mixed lipid feedstock, or the saponification reaction product, or the thermal hydrolysis reaction product, and before or after or simultaneous to when the reaction vessel reaches the desired temperature and pressure to carry out the acidulation step, the resulting reaction mixture is agitated, or otherwise mixed in order to maximize the contacting of the soaps with the carbonic acid (generated once $CO_2$ reacts with the water present in the mixture). The mixture can be agitated using any suitable method known in the art, e.g. a spinning blade mixer. In alternative embodiments, the mixture is agitated for between about 10 minutes to about 200 minutes, e.g. between about 25 minutes to about 150 minutes, or between about 20 minutes to about 60 minutes, or about 30 minutes.

In alternative embodiments, following the agitation step, the contents of the acidulation reaction vessel are allowed to settle, allowing for the formation of a lipid layer and aqueous layer. The lipid layer floats on the top of the aqueous layer. In alternative embodiments, the lipid layer comprises free fatty acids and any non-acidulated soaps, and the aqueous layer comprises, for example, water, glycerol, phosphate salts, sodium bicarbonate, smaller amounts of sodium carbonate (or other equivalent salts), unsaponifiable material e.g. waxes and sterols, and dissolved carbonic acid. In alternative embodiments, the lipid layer comprising the free fatty acids generated in the acidulation reaction is separated from the remaining reaction products. The separation technique used can be any suitable separation technique known in the art. In alternative embodiments, the reaction products of the acidulation step are transferred to a separation vessel, e.g. a decanter wherein the mixture is allowed to settle and allowed to separate, forming an aqueous phase and a "lipid" phase comprising the free fatty acids which floats on top of the aqueous phase. In alternative embodiments, the decantation procedure results in the formation of separate lipid and aqueous phases in approximately 1 hour or less, depending on the configuration of the reaction vessel. Other separation techniques, e.g. centrifugation, may also be used in accordance with embodiments as provided herein. In certain embodiments, the acidulation product mixture is not transferred to a separate vessel in order to separate the lipids from the remaining reaction products. In such embodiments, the aqueous layer is drained from the bottom of the reaction vessel and the lipid layer is recovered as the reaction product.

In alternative embodiments, the reaction products generated during the acidulation reaction are transferred to a separation unit in such a way that the loss of any gaseous $CO_2$ is minimized, e.g. via the use of a liquid level control feedback or other suitable method.

In certain embodiments, after the acidulation reaction, the reaction vessel is depressurized, allowing for the dissolved carbonic acid to separate out of the solution as gaseous $CO_2$. In such embodiments, the captured $CO_2$ is recycled for use in the acidulation step.

In alternative embodiments, the process comprises multiple acidulation reactions e.g. between about 1 and 20, or about 1, 2, 3, 4, 5, 6, 7, 8, or 9 or more acidulation reactions. In such embodiments, following the first acidulation reaction as described above, the reaction vessel is depressurized and the $CO_2$ is captured and recycled. The lipid layer is then separated or otherwise removed from the aqueous layer, and water is added into the reaction vessel containing the lipid layer. $CO_2$ is then added to the reaction vessel until the desired pressure is reached as described above. The reaction vessel is then heated and agitated as previously described and allowed to settle. The resulting lipid layer is then separated or otherwise removed from the aqueous layer as previously described. The resulting lipid layer is then separated or otherwise removed and can optionally be subjected to additional acidulation reactions as previously described, wherein additional water and $CO_2$ is added and the resulting mixture agitated at the desired temperature and pressure and the resulting lipid layer is separated or otherwise removed from the aqueous layer. The number of acidulation reactions in the process can vary depending on the desired free fatty acid yield and process economics. In certain embodiments, the number of acidulation reactions is sufficient to acidulate substantially all of the soaps present in the thermal hydrolysis product mixture, e.g. between about 1 to 8, or more, acidulation reactions, e.g., about 2, 3, 4 or more acidulation reactions.

In alternate embodiments, following a first acidulation reaction, e.g., as described above, the reaction vessel is not depressurized and the $CO_2$ is allowed to remain (under pressure) in the pressure vessel. In alternate embodiments, the aqueous layer is subsequently drained from the bottom of the reactor and optionally can be recycled to be used in subsequent acidulation reactions where the $CO_2$ remains pressurized in the vessel.

In alternative embodiments, a salt, e.g. sodium chloride or other equivalent salt, is added to the product mixture following an acidulation reaction. The addition of NaCl or equivalent salt to the acidulation reaction product increases the ionic strength of the product mixture and prevents the lipid layer from emulsifying with the aqueous layer. In certain embodiments, the process comprises one or more acidulation reactions and the salt, e.g. NaCl, is added to the product mixture generated by the first acidulation reaction. In certain embodiments, the process comprises two or more acidulation reactions, e.g. six acidulation reactions, and the salt is added to the product mixture generated by the third acidulation reaction.

The acidulation reaction, or multiple acidulation reactions, can take place in any suitable reaction vessel known in the art. In alternative embodiments, the reaction can be a batch or continuous process, depending on the desired throughput of material from the reaction. In embodiments of the process comprising multiple acidulation reactions, the multiple acidulation reactions can take place in the same reaction vessel or in separate reaction vessels. In embodiments comprising multiple acidulation reactions taking place in multiple reaction vessels, the lipid layer generated during each acidulation reaction is separated or otherwise removed from the corresponding aqueous layer and transferred to a separate reaction vessel wherein the lipid layer is mixed with water and $CO_2$ and the resulting mixture is agitated for the desired period under the desired temperature and pressure conditions and allowed to settle in order to generate a new lipid layer.

In alternative embodiments, the separated free fatty acids generated in the acidulation reaction are subjected to further processing steps. In alternative embodiments, the free fatty acids are further separated by their carbon chain length, i.e. the number of carbon atoms contained in the aliphatic tail portion of the free fatty acid, which can comprise, in alternative embodiments, between 4 and 28 carbon atoms. In alternative embodiments, the free fatty acids are separated by their saturation. In alternative embodiments, the saturated free fatty acids are separated from the unsaturated free fatty acids. In alternative embodiments, the separated free fatty acids are separated into short-chain fatty acids (aliphatic tail length of fewer than 6 carbon atoms), medium-chain fatty acids (aliphatic tail lengths of between 6 and 12 carbon atoms), long-chain fatty acids (aliphatic tail length of between 13 and 21 carbon atoms), and very long-chain fatty acids (aliphatic tail length of 22 or more carbon atoms). In alternative embodiments, the separated free fatty acids are separated into individual fatty acids streams based on the length (number of carbon atoms) of their aliphatic tails.

In alternative embodiments, the separated free fatty acids can be further separated into distinct cuts, based on their aliphatic tail length and/or saturation, using any suitable technique or combination of processes known in the art, e.g. ion exchange, continuous ion exchange, chromatography, continuous chromatography or the like.

In alternative embodiments, the thermal hydrolysis reaction and the acidulation reaction take place sequentially; or, the thermal hydrolysis reaction and the acidulation reaction can take place simultaneously, e.g., as in a "one pot" reaction in one reaction vessel.

Separation of Fatty Acids Away from Unreacted Soap:

In alternative embodiments, a lipid phase or a lipid component is separated (and optionally constituents of the lipid phase or lipid component phase are further separated and isolated) from the products of the acidulation reaction(s), wherein optionally this lipid phase or lipid component can comprise a small percentage of unreacted soaps, for example, soaps that were not acidulated to generate free fatty acids, e.g., wherein the amount of soaps that were not acidulated to generate free fatty acids comprise between about 0.01 wt % and 70 wt %, or between about 0.05 wt % and 65 wt %, 1 wt % and 60 wt %, or between about 5 wt % and 50 wt %, or between about 10 wt % and 40 wt %, or about 10, 15, 20, 25, 30, 35, 40, 45 or more wt % of the lipid phase or lipid component.

In order to increase the overall efficiency of the lipid phase or lipid component separation process, in alternative embodiments the process comprises a distillation or alternative separation step wherein the lipid phase or lipid component comprising a small amount of unreacted soaps is transferred to a distillation column, a flash vessel, a wiped film evaporator, or any other separation apparatus or combination of separation processes, to effect (cause the) the separation of free fatty acids from (substantially) the rest of the components in the lipid phase. In alternative embodiments, the addition of the separation step removes a majority of (e.g., substantially most of), e.g., 85%, 90%, 95%, 98%, 99% or more, of the free fatty acids and leaves a residue, e.g., from a still pitch residue (bottoms stream from a distillation unit).

In alternative embodiments, water in the lipid phase is removed prior to entering the separation unit; for example, all of the water or substantially all of the water or a partial amount of the water is removed. In alternative embodiments, water in the lipid phase is removed along with fatty acids in the separation unit. In alternative embodiments, any number of unit operations can be utilized to accomplish removal of water.

In alternative embodiments, the water in the lipid phase is removed inside of the same separation unit that removes fatty acids; for example, the separation of free fatty acids from (substantially) the rest of the components in the lipid phase can be done in an evaporator, or any equivalent apparatus, and all or substantially most of the water can be removed inside of this same evaporator.

In alternative embodiments, color and odor bodies are removed at any point in the process; removal of color and odor bodies can be for (or result in) increasing the purity of the fatty acids. In alternative embodiments, color and odor bodies are removed in the 'lights' cut of a dryer or a distillation unit, but any other means of removal may be utilized in lieu of or in addition to the dryer or distillation unit, or any equivalent process units.

In alternative embodiments, non-fatty acid components inside of the residue created by the fatty acid recovery unit can be recycled upstream into the system. In alternative embodiments a purge (or removal) of the residue stream is utilized so as to prevent these non-fatty acid components (e.g., sterol, sterol ester, polymers, etc.) from accumulating to an unsustainable level, for example, to a weight percent of the residue stream in the range of 50-70%.

In alternative embodiments, additional separation techniques are utilized to recover components that contribute to the total fatty acid content (e.g. residual fatty acid, monoglyceride, and the like) so as to increase overall recovery of total fatty matter of the system.

In alternative embodiments, the fatty acids or fatty acid derivatives recovered may undergo any number of additional processing steps, e.g. adsorption, crystallization, chromatography, fractional distillation, etc. One purpose of this additional processing is to increase the value of one or more of the compounds by increasing their isolated purity. Examples of components that can be found in the recovered fatty acids include, but at not limited to: linoleic acid, palmitic acid, oleic acid, ricinoleic acid.

In alternative embodiments, the fatty acids recovered are used in oleochemical and fuel markets. Examples of oleochemicals comprise dimers acids, mining flotation agents, surfactants, etc. Examples of fuels comprise biodiesel and renewable diesel.

Valorization of Compounds Concentrated in the Fatty Acid Recovery Unit Residue:

In alternative embodiments, the compounds of the fatty acid recovery unit residue that are purged from the system undergo additional separation by e.g., vaporization, crystallization, extraction, chromatography, etc. One purpose of this separation is to increase the value of one or more of these compounds by increasing their isolated purity. Examples of components that can be found in this residue include, but are not limited to: triglycerides, sterols, sterol esters, oryzanol (including gamma oryzanol, optionally also comprising cycloartenyl ferulate (Oryzanol A), 24-methylenecycloartanyl ferulate (Oryzanol C) and/or campesteryl ferulate).

Electrolysis of Lipid Phase from Acidulation Reaction:

In alternative embodiments, the lipid phase having been separated in the foregoing acidulation reaction(s) comprises a small percentage of unreacted soaps, for example, soaps that were not acidulated to generate free fatty acids, e.g., between about 5 wt % and 30 wt %, or about 10 wt % of the lipid phase. In order to increase the overall efficiency of the process, alternative embodiments of the process comprise an electrolysis step wherein the lipid phase comprising a small amount of unreacted soaps is transferred to an electrolysis unit wherein the soaps in the lipid are reacted with an anolyte to generate free fatty acids. In alternative embodiments, the addition of the electrolysis step converts substantially all, e.g., 90%, 95%, 98%, or 99% or more of the unreacted soaps to free fatty acids.

In alternative embodiments comprising the electrolysis step, the lipid layer from the acidulation reaction(s) is transferred to an electrolysis unit (e.g. a hydrogen evolving cathode (HEC) electrolysis unit) comprising a vessel or suitable container comprising an anode (the anode vessel) and a vessel or other suitable container comprising a cathode (the cathode vessel) separated by a selective filtration membrane, e.g. a polytetrafluoroethylene (PTFE) membrane. In alternative embodiments, the anode is comprised of a mixed metal oxide (MMO) layer coated onto a stable metal substrate, e.g. titanium. In alternative embodiments, the cathode can be, for example, titanium or a Monel alloy (a nickel alloy primarily composed of nickel (up to 67%) and copper), or any other substrate that is stable in a reducing environment.

In alternative embodiments, a solution comprising an anolyte is added to the anode vessel. In alternative embodiments the anolyte is a sodium and/or potassium salt, e.g. sodium or potassium sulfate (for illustrative purposes, sodium sulfate is the anolyte in the remaining description of the electrolysis step, although those skilled in the art would appreciate that an equivalent anolyte such as potassium sulfate may be substituted in the process). Simultaneously, the cathode vessel is filled with a catholyte, e.g. sodium hydroxide. In alternative embodiments, a current is passed through the electrolysis unit resulting in the oxidation of the sodium sulfate, thereby generating sodium ions and sodium bisulfate. The current also can serve to oxidize the water, generating hydrogen ions. The generated sodium ions are pushed across the electrolysis membrane and the generated sodium bisulfate results in a reduction of the pH of the anolyte solution to, e.g. about 3. Once the pH has reached a suitable level, e.g. about 3, a portion of the separated lipid from the acidulation step can be introduced into the vessel with the anolyte solution wherein any unreacted soaps in the lipid layer react with the sodium bisulfate to generate free fatty acids and sodium sulfate. The generated free fatty acids can be separated from the anode vessel by any suitable method in the art, e.g. through a pipe at the top of the anode vessel and into separate side tank. The generated sodium sulfate acts as the regenerated anolyte which, after the fatty acids have been removed from the anode vessel, and can be oxidized by passing a current through the anode. As such, the electrolysis unit operates in a semi-continuous fashion, wherein sodium sulfate is oxidized to generate sodium bisulfate, thereby lowering the pH of the anolyte solution. In alternative embodiments, once the pH has reached a suitable level, e.g. about 3 additional lipid material from the acidulation reaction step is added, and the soaps present in the lipid material react with the sodium bisulfate to generate free fatty acids and sodium sulfate.

In alternative embodiments, as the electrical current is passed through the cathode, the water is reduced, thereby generating hydroxide ions. As the sodium ions are pushed across the membrane from the anode vessel into the cathode vessel, they react with the generated hydroxide ions to generate sodium hydroxide. In alternative embodiments, the starting concentration of the catholyte (sodium hydroxide) can be about 30 wt %. As additional sodium hydroxide can be generated (from the sodium ions moving across the membrane and into the cathode and reacting with the hydroxide ions), the concentration of sodium hydroxide can be increased to, e.g. about 33 wt %, before some of the sodium hydroxide is removed to bring the concentration back down to its original concentration, e.g. 30 wt %. The generated sodium hydroxide solution comprising sodium hydroxide and water can be recycled, or sold as a value added product.

In alternative embodiments, the electrolysis unit is a hydrogen evolving cathode (HEC) unit with a current density in the range of about 1-10 kA/m$^2$. In alternative embodiments, the voltage of the individual cells of the unit can be in the range of between about 3 and 15 volts. In alternative embodiments, the unit comprises holding tanks for the anolyte and catholyte for electrolyte balancing as the process is carried out. In alternative embodiments, the holding tank of the catholyte also serves as the additional tank for the lipid product, as well as a decanter for separating fatty acids generated in the process. In alternative embodiments, upon startup of the electrolysis unit, the sodium sulfate anolyte is electrolyzed, causing the pH of the anolyte solution to drop from, e.g. about 7 to about 3 to 3.5, and the temperature of the anode vessel is increased to between about 40 to 90° C., or above the melting point of the lipid solution entering the anode. In alternative embodiments, the lipid product is added to the anolyte solution until the pH increases to, e.g. about 4.5, after which point the addition of the lipid product is halted. In alternative embodiments, once the anolyte is electrolyzed, it contacts the soaps, which float in the holding tank/decanter due to limited solubility in the anolyte. Once the pH in the anolyte solution is reduced to about 3 to 3.5, the circulating pump halts and fatty acids can be decanted from the anolyte for downstream processing.

In alternative embodiments, the foregoing electrolysis procedure is used as a total replacement of the acidulation reaction comprising acidulating soaps using carbonic acid. In such embodiments, the thermal hydrolysis product mixture generated in the thermal hydrolysis reaction is subjected to electrolysis as described above, wherein the product entering the anode vessel of the electrolysis unit is the thermal hydrolysis product mixture rather than the lipid layer separated from the acidulation product mixture.

Treatment of Aqueous Phase from Acidulation Reaction:
Evaporation/Drying

In alternative embodiments, the aqueous phase generated in the one or more acidulation reactions is subjected to one or more processing steps in order to recover desirable reaction products that remain in the aqueous phase of the acidulation reaction products and/or to treat the aqueous phase such that the resulting product meets or exceeds relevant regulatory standards relating to animal feed additives.

In alternative embodiments, the aqueous phase, or multiple aqueous phases (i.e. collected from acidulation reactions) is treated to remove water, e.g. by any suitable drying method (e.g. evaporation via falling film, forced recirculation flashing, or any other suitable method) known in the art, thereby generating a product comprising salts, optionally sodium bicarbonate and/or sodium carbonate, or equivalents. In alternative embodiments, the water that is removed can be recycled for use anywhere inside or outside of the system.

In alternative embodiments, once a majority of the water has been removed from the aqueous stream(s), the resulting product can be dried further to generate a salt stream, optionally a sodium bicarbonate and/or sodium carbonate product, or equivalents, that is substantially free of any water, for example, the resulting product can be dried further to generate a salt product that is less than about 25% water, less than about 20% water, less than about 10% water, or less than about 5% water, or less than about 1% water. Suitable apparatuses for creating a substantially dry product include fluidized bed dryers, lyophilizers, spray dryers, and rotary drum dryers. The generated dried product can be used in any application that utilizes a crude salt stream, e.g. as an animal feed additive.

Filtration

In alternative embodiments, the aqueous phase(s) generated in the one or more acidulation reactions is subjected to one or more processing steps in order to recover desirable reaction products that remain in the aqueous phase of the acidulation reaction products and/or to treat the aqueous phase such that the resulting product meets or exceeds relevant regulatory standards relating to wastewater. In alternative embodiments, the water that is removed can be recycled for use anywhere inside or outside of the system. In alternative embodiments, the aqueous phase(s) generated during one or more acidulation reactions can comprise various organic molecules and salts in addition to water. The exact composition of the aqueous phase(s) will vary depending on the feedstock used in the process, as well as other process variables, e.g. the reaction conditions, separation technique to separate the lipid phase from the aqueous phase during the acidulation process, etc. In alternative embodiments, the aqueous phase(s) may include, in addition to water: sodium bicarbonate (or equivalent salt), glycerol, phosphates, cholines, ethanolamines, sodium sulfate (or equivalent salt), inositol, unreacted saponifiable material, e.g. soaps and/or glycerides, residual (small amounts of) free fatty acids, other organic or inorganic compounds, or any combination thereof.

The composition of an exemplary aqueous phase generated in the acidulation step comprising 6 acidulation reactions, wherein the feedstock of the process is a soapstock obtained from the processing of a crude soybean oil, is described below:

| | |
|---|---|
| Water | 92.8% |
| Sodium sulfate | 1.4% |
| Glycerin | 0.79% |
| Choline | 0.06% |
| Ethanolamine | 0.02% |
| Inositol | 0.05% |
| Phosphate | 0.12% |
| Sodium bicarbonate | 4.72% |

In alternative embodiments, the aqueous phase(s) may be treated using filtration, e.g. a size-exclusion filtration system. In alternative embodiments, the filtration step may be operationally in-line (i.e. continuously) with the acidulation step such that aqueous phase generated in each acidulation reaction (if the embodiment comprises more than one acidulation reaction) is treated immediately after or during the point at which the aqueous phase is separated from the lipid phase. In other embodiments, the aqueous phases may be collected and treated in a single batch.

In alternative embodiments, wherein the process comprises multiple acidulation reactions, the aqueous phase generated in each of the acidulation reactions is continuously pumped through a filtration mechanism, e.g. a nano- or microfiltration system or other appropriate membrane filtration system which may be selected from any of the known nano-, micro- or other appropriate size-exclusion filtration mechanisms or systems known in the art. In alternative embodiments, the size of the pores of the filter allows for the rejection (i.e. allows the particles to pass through the membrane) of certain particles, e.g. soaps and/or phosphates, and retains (i.e. does not allow the particles to pass through the membrane) the sodium bicarbonate (or other equivalent salt). In alternative embodiments, the particles that pass through the membrane of the filter have a molecular weight less than the molecular weight of sodium palmitate, e.g. sodium bicarbonate, sodium phosphates, etc. In alternative embodiments, rejected particles are sodium (or other equivalent) soaps, e.g. sodium palmitate, sodium oleate, etc. In alternative embodiments, the filtration system provides for a more efficient process in that the soaps and/or other saponifiable material rejected by the membrane of the filter are returned to the lipid phase for subsequent acidulation reactions, thereby increasing the overall fatty acid yield of the process.

In alternative embodiments, the addition of a filtration step in the process serves to drive the acidulation reaction to completion by removing the sodium bicarbonate (or other equivalent salt) from the acidulation product. Sodium bicarbonate can "back-react" with the fatty acids generated in the acidulation step, wherein some of the fatty acids react with the sodium bicarbonate to generate soaps, thereby lowering the overall fatty acid yield of the process. By removing the generated sodium bicarbonate from the acidulation products, the opportunity for back-reacting with the sodium bicarbonate is diminished and the fatty acid yield of the process is increased.

In alternative embodiments, the filtration step is carried out in a pH range of between about 6 and 11 and a pressure of between about 50 and 800 psi, while maintaining a temperature of between about 23 and 100° C. In alternative embodiments, the pH of the acidulation product solution on which the filtration step is carried out varies depending on the amount of sodium bicarbonate in the solution. As the sodium bicarbonate is removed, e.g. via filtration, the pH drops and becomes increasingly acidic, thereby driving the acidulation reaction to completion. In alternative embodiments, the aqueous phase of the acidulation reaction(s) is pumped through the filter at a range of between about 1 and 100 gallons per minute. In alternative embodiments, the size of the pores in the filter membrane has a molecular weight cutoff (MWCO) of between about 100-250 Daltons.

In alternative embodiments, the retained portion of the aqueous phase comprising the sodium bicarbonate (or other equivalent salt if sodium hydroxide was not used in the saponification reaction step) is then subjected to a concentration step using, for example, reverse osmosis (RO). In alternative embodiments, the conditions for the RO step are similar to those of the filtration step, i.e. a pH in the range of between about pH 6 and pH 11, a pressure of between about 50 psi and 800 psi, while maintaining a temperature of between about 23° C. and 100° C. In alterative embodiments, the concentrated sodium hydroxide can be discarded or sold, increasing the overall efficiency of the process. In alternative embodiments, the water produced in the RO step is suitably pure to be recycled within the acidulation step, thereby increasing the efficiency of the process and reducing total water consumption.

Lime Treatment and Oxidation of Organics

In alternative embodiments, the aqueous phase generated in the acidulation reaction, or multiple acidulation reactions, is collected and contacted with calcium hydroxide, i.e. slaked lime. The amount of lime added to the aqueous phase is generally an amount sufficient to increase the pH of the solution to about 11. In alternative embodiments, the lime-treated aqueous phase is allowed to react for a period of between about 1 and 24, or more, hours. During the reaction time, various precipitates can form and the pH of the solution can increase to about 12 or 13.

In the same lime-contacting step described above, various calcium precipitates are formed when they react with various components in the aqueous phase. These precipitates can include, for example, various calcium phosphates (i.e. $Ca_x(PO_4)_x$). Other components of the lime-treated aqueous phase can include, for example, those products that were present in the recovered aqueous phase of the one or more acidulation reactions that did not react with the lime, e.g. glycerol, ethanolamines, choline, other organics, or any combination thereof.

In order to satisfy the Biochemical Oxygen Demand requirements (BOD) (the amount of dissolved oxygen needed by aerobic biological organisms to break down organic material present in a given water sample at certain temperature over a specific time period) for conventional wastewater treatment facilities, in alternative embodiments, the lime-treated aqueous phase product is subjected to an oxidation step in which the organics present in the solution, e.g. phosphorous, glycerin, and other organics are fully oxidized into gaseous products that precipitate out of solution. In alternative embodiments, the lime-treated aqueous phase is subjected to Fenton oxidation wherein hydrogen peroxide and $Fe^{2+}$ ions are used to catalyze OH radical formation. In alternative embodiments, the Fenton oxidation step is carried out by adding between about 1 and 10 grams of hydrogen peroxide per liter of aqueous phase liquid and between about 0.1 and 1.0 mol $Fe^{2+}$ per mol of hydrogen peroxide to the lime-treated aqueous phase. The resulting mixture is then allowed to react for between about 1 and 24 hours at a temperature of between about 20-50° C. Once the hydrogen peroxide and Fe' are added to the lime-treated aqueous phase, the pH will drop rapidly to between about 3 and 9, e.g. less than pH 7. The pH then rises slowly as the organics are gasified and leaves the solution. The reaction is considered complete when the rate of change in the pH of the solution is less than about 0.1 units/hour. UV oxidation can optionally be used in combination with Fenton oxidation.

In alternative embodiments, following the oxidation step, the solution is then contacted with fresh lime to precipitate any unbound phosphorus and other acidic species. The conditions for the second lime treatment step are identical to those of the first lime treatment step.

Electrolysis of Aqueous Phase

In alternative embodiments, the aqueous phase is subject to electrolysis to recover monovalent ions as a base for a value added product. In alternative embodiments, as the electrical current is passed through the cathode, the water is reduced, thereby generating hydroxide ions. As the monovalent ions, e.g. sodium or potassium, are pushed across the membrane from the anode vessel into the cathode vessel, they react with the generated hydroxide ions to generate the corresponding hydroxide base, e.g. sodium hydroxide or potassium hydroxide, which can be recovered and sold as a value added product.

Use of Aqueous Phase for Nutritional Value

In alternative embodiments, the nutrients contained in the aqueous phase, either as-is or concentrated, can be utilized for biogas production, algae growth, fermentation feed, addition to animal feed, etc. Since there can be a significant amount of nutrients and BOD in the aqueous phase, in alternative embodiments this stream is applied towards value-added applications where allowable.

Fatty Acids Recovered for Use in Oleochemical and Fuel Markets

In alternative embodiments, fatty acids and fatty acid derivative made by processes as provided herein are recovered for use in oleochemical and fuel markets, the main fuel market being the rapid-expanding renewable/green diesel market. Since soapstock is generally only converted to acid oil, which is usually a mixture of phospholipids, glycerides and fatty acids that is sold into the animal feed market, before this invention this low cost feedstock has not been previously available to the renewable diesel and biodiesel industries. Provided herein are processes that effectively and economically convert low cost soapstock and/or other mixed lipid feedstocks into fatty acids that are useable by the renewable diesel industry.

Any of the above aspects and embodiments can be combined with any other aspect or embodiment as disclosed here in the Summary, Figures and/or Detailed Description Sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially", "substantially all", "substantially most of", "substantially all of" or "majority of" encompass at least about 90%, 95%, 97%, 98%, 99% or 99.5%, or more of a referenced amount, e.g., of a composition. For example, substantially all of the free fatty acids are esterified to generate fatty acid alkyl esters encompasses at least about 90%, 95%, 97%, 98%, 99% or 99.5%, or more of the free fatty acids are esterified to generate fatty acid alkyl esters.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

The invention will be further described with reference to the examples described herein; however, it is to be understood that the invention and embodiments as provided herein are not limited to such examples.

EXAMPLES

Example 1: Thermal Hydrolysis and Acidulation of Mixed Lipid Feedstock

This example describes an exemplary protocol of the invention:

A mixed lipid feedstock comprised of soapstock, glycerides, and phospholipids was obtained from an oil refining facility. The mixed lipid feedstock was added to a vessel and subject to thermal hydrolysis to free the fatty acids from their glycerol backbones and phosphate groups. The lipid product resulting from the thermal hydrolysis reaction was then subjected to a first acidulation reaction wherein $CO_2$ was introduced into the reaction vessel comprising the lipid product. The $CO_2$ reacted with the water in the lipid product to form carbonic acid and acidulated soaps, thereby generating an acidulation reaction product comprising a first lipid layer of free fatty acids and an aqueous layer comprising water glycerol, sodium bicarbonate, unsaponifiable material, e.g. waxes and sterols, dissolved carbonic acid, and phosphate salts.

Feedstock Description:

The feedstock used in the present example was a mixed soapstock obtained from a natural oil refinery. Water was added to the mixed feedstock to ensure a ratio of 5:1 water-to-total dissolved solids (TDS), or water:TDS. The mixture was then added to an autoclave (e.g., a Parr) reactor where thermal hydrolysis was performed. The total mass added to the 2 L autoclave (e.g., Parr) reactor was 1.4 kg of feedstock material and water.

Composition of Feedstock:

55 gallons soy soapstock (Archer Daniels Midland, Chicago, Ill.); Makeup: 24.7 wt % TDS (Soaps, saponifiable material, and unsaponifiable material), 15.9 wt % free fatty acids (64% dry TFA based on TDS) and 46.14 wt % water.

Thermal Hydrolysis Reaction:

Thermal Hydrolysis Reaction:

Nitrogen gas was used to purge the reactor of air once the feedstock was added. This was repeated 5 times to guarantee the air had been purged from the reactor. The reactor temperature was set to 270° C. which allowed thermal hydrolysis to occur. Agitation was set to approximately 60 rpm to allow minimal movement. The temperature was held at 270° C. for 30 minutes. The reactor was then allowed to cool to 90° C. and a post-thermal hydrolysis sample was acquired from the bottom of the reactor.

Acidulation Reaction:

Acidulation Reaction:

After the thermal hydrolysis reaction, $CO_2$ was slowly introduced, e.g., over a period of about 8, 9 or 10 minutes or more, into the sealed reaction vessel through a port located near the bottom of the vessel. $CO_2$ was continually added to the reaction vessel until the pressure inside the vessel reached 300 psig. The reaction vessel was maintained at a temperature of 90° C. and agitated using a spinning blade mixer spinning at 400 rpms for a period of 30 minutes. After 30 minutes, the contents of the reaction vessel were allowed to settle for 10 minutes. During settling, a lipid layer and an aqueous layer formed and the lipid layer floated on top of the aqueous layer. The aqueous layer was drained from the bottom of the reaction vessel.

Second Acidulation Reaction:

After the aqueous layer was removed following the first acidulation reaction, the reaction vessel was not depressurized. The contents in the reaction vessel were agitated using the spinning blade mixer as 95 parts fresh water (based on 100 parts of the first aqueous fraction) was simultaneously introduced through the top of the reaction vessel. The reaction vessel was maintained at a temperature of 90° C. and agitated using the spinning blade mixer at 400 rpms for a period of 30 minutes. After 30 minutes, the contents of the reaction vessel were allowed to settle for 10 minutes. During settling, a lipid layer and an aqueous layer formed and the lipid layer floated on top of the aqueous layer. The aqueous layer was drained from the bottom of the reaction vessel.

Analysis of FFA Content and FFA Profile:

Following the second acidulation reaction, a sample of the hexane layer comprising the free fatty acids (FFAs) was removed from the reaction vessel for analysis. First, the hexane was removed from the sample. Using acid titration, it was determined that the fatty acid content of the sample was 91 wt % FFA (normalized based on FFA & soap). The remainder of the sample was comprised of soaps and various unsaponifiable material. The fatty acid profile of the sample is shown is Table 2.

TABLE 2

| Fatty acid profile of sample | | | |
|---|---|---|---|
| C16 | C18 | Other FFAs | Monos, di-acids, etc. |
| 19% | 79% | <1% | ≤1% |

Example 2: Electrolysis of Lipid Phase from Acidulation Reaction

Materials:

Two one liter working solutions in 2 L glass beakers with stirbars on 1000 W hotplates being recirculated by constant flow rate peristaltic pumps @ 60° C. (anolyte is saturated aqueous sodium sulfate and catholyte is 10 wt % sodium hydroxide); 5 cm² NAFION 115™ membrane, PVC body and tubing, 6"×1" DSA, 6"×1" Monel 400 cathode.

Using 0-30 V 0-20 A DC power supply, turn power supply on to provide constant amperage of 3 A to electrodes in PVC system. Pump anolyte and catholyte around with their respective peristaltic pumps at 750 mL/min and heat both to 60° C. Reduce anolyte (side with $Na_2SO_4$ solution) pH to about 3 to 3.5 before slowly adding enough saponified soapstock to increase pH of anolyte to 5. Stop addition of saponified soapstock and allow electrochemical cell to reduce anolyte pH back to about 3 to 3.5 before adding more saponified soapstock. Halt cycle once 60 minutes of run time has been reached and perform liq-liq extraction of floating fatty material with nonpolar solvent. A rotary evaporator (or rotavap/rotovap) solvent from crude fatty phase to obtain anhydrous material for characterization.

Result: 12 g fatty material, 1 wt % soap, 99 wt % FFA via titration.

Total energy usage: 1740 kWhr/metric ton FFA produced.

Example 3: Acidulation of Mixed Lipid Feedstock without Thermal Hydrolysis

This example describes an exemplary protocol of the invention:

A mixed lipid feedstock comprised of soapstock, glycerides, and phospholipids was obtained from an oil refining facility. The mixed lipid feedstock was added to a vessel and subjected to a first acidulation reaction wherein $CO_2$ was introduced into the reaction vessel comprising water and the mixed lipid feedstock. The $CO_2$ reacted with the water in the lipid product to form carbonic acid and acidulated soaps, thereby generating an acidulation reaction product comprising a first lipid layer of free fatty acids, fatty acid soaps, glycerides, and unsaponifiables and an aqueous layer comprising water and sodium bicarbonate.

Feedstock Description:

The feedstock used in the present example was a mixed soapstock obtained from a natural oil refinery. Water was added to the mixed feedstock to ensure a ratio of 5:1 water-to-total dissolved solids (TDS), or water:TDS. The mixture was then added to an autoclave (e.g., a Parr) reactor where acidulation was performed. The total mass added to the 2 L autoclave (e.g., Parr) reactor was 1.6 kg of feedstock material and water.

Composition of Feedstock:

55 gallons palm oil soapstock; Makeup: 43 wt % TFM (total fatty matter) and 54 wt % water.

Acidulation Reaction:

Acidulation Reaction:

After the mixed lipid feedstock and water were added to the 2 L autoclave, $CO_2$ was slowly introduced, e.g., over a period of about 8, 9 or 10 minutes or more, into the sealed reaction vessel through a port located near the top of the vessel. $CO_2$ was continually added to the reaction vessel until the pressure inside the vessel reached 500 psig. The reaction vessel was maintained at a temperature of 90° C. and agitated using a spinning blade mixer spinning at 400 rpms for a period of 30 minutes. After 30 minutes, the contents of the reaction vessel were allowed to settle for 10 minutes. During settling, a lipid layer and an aqueous layer formed and the lipid layer floated on top of the aqueous layer. The aqueous layer was drained from the bottom of the reaction vessel.

Analysis of Post-$CO_2$ Phase:

Following the first acidulation reaction, a sample of the top lipid layer comprising the free fatty acids (FFAs) and fatty acid soaps was removed from the reaction vessel for analysis. Using titration, it was determined that the water content of the sample was 23 wt %, the acid value was 105 and the soap % was 10.

Example 4: Acidulation of Mixed Lipid Feedstock without Thermal Hydrolysis

This example describes an exemplary protocol of the invention:

The same procedure as was used in Example 3 was used in Example 4, except the feedstock was a low-gum soy soapstock that was generated by a refinery practicing independent degumming. This soapstock consisted of 35 wt % water and 60% TFM. Following the acidulation reaction, the top lipid layer was analyzed to contain 31 wt % water, acid value of 89 and soap % of 15.

REFERENCES

Asbeck, Lutz Signard, et al., Patent EU 0406945A2. 1 Sep. 1991.
Beal, R. E., et al., *J Am Oil Chem Soc Journal of the American Oil Chemists' Society* 49.8 (1972): 447-50.
Berry, William W., et al. Patent US 2016201010A1. 14 Jul. 2016.
Bills, Alan M. Acidification of Tall Oil Soap. Westvaco Corporation, assignee. U.S. Pat. No. 3,901,869. 26 Aug. 1975.
Bin, Wu et al. Patent CN 101565654 A. 28 Oct. 2009.
Bloomberg, Fritiof M., and Thomas W. Hutchins. Soapstock Acidulation. Arkansas Grain Corp, assignee. U.S. Pat. No. 3,425,938 A. 9 Jun. 1967.
Brister, Bryan Cole. U.S. Pat. No. 2,812,343. 5 Nov. 1957.
Dayton, Chris, and Flavio Galhardo. "Enzymatic Degumming." *Green Vegetable Oil Processing* (2014): 107-45.
Deng, Qi, Qunhui Wang, Qi Wang, Qifei Huang, and Pinghe Yin. "Study on Saponification Technology of Waste Edible Oil." 2009 *3rd International Conference on Bioinformatics and Biomedical Engineering* (2009).
Dowd, Michael K. *Journal of Chromatography A* 816.2 (1998): 185-93.
Dumont, Marie-Josée, and Suresh S. Narine. "Characterization of Soapstock and Deodorizer Distillates of Vegetable Oils Using Gas Chromatography." *Lipid Technology* 20.6 (2008): 136-38.
Dumont, Marie-Josée, et al., *Food Research International* 40.8 (2007): 957-74.
Echim, Camelia, et al., *Energy & Environmental Science Energy Environ. Sci.* 2.11 (2009): 1131.
Eyal, Aharon et al. Soapstock Treatment. Cargill Incorporation, assignee. Patent WO 2005095565A1. 13 Oct. 2005.
Fardell Jr., William G. Recovery of Crude Tall Oil. Westvaco Corporation, assignee. U.S. Pat. No. 4,075,188. 21 Feb. 1978.
Fizet, Christian. Process for Tocopherols and Sterols from Natural Sources. Hoffmann-La Roche Inc, assignee. U.S. Pat. No. 5,487,817. 30 Jan. 1996.
Geier, Douglas F., et al., U.S. Pat. No. 7,705,170B2. 27 Apr. 2010.
Haas, Michael J. *Fuel Processing Technology* 86.10 (2005): 1087-096.
Haas, Michael J., et al., U.S. Pat. No. 6,855,838B2. 15 Feb. 2005.
Haas, Michael J., et al., *Energy & Fuels Energy Fuels* 15.5 (2001): 1207-212.
Haas, Michael J., et al., *Journal of the American Oil Chemists' Society J Amer Oil Chem Soc* 77.4 (2000): 373-79.
Hangx, S. J. T. *Subsurface Mineralisation: Rate of CO2 Mineralisation and Geomechanical Effects on Host and Seal Formations*. Tech. Utrecht University: HPT Laboratory, Department of Earth Sciences, December 2005.
Huibers, Derk T A, et al., U.S. Pat. No. 5,283,319. 1 Feb. 1994.
Huibers, et al. Improved Acidification of Tall Oil Soap Using Carbon Dioxide. Union Camp Corporation, assignee. Patent WO 93/23132. 25 Nov. 1993.
Jin, B., et al., *Fuel Processing Technology* 89.1 (2008): 77-82.
Kulkarni, B. M., et al. "Investigation of Acid Oil as a Source of Biodiesel." *Indian Journal of Chemical Technology* 15 (2008): 467-71.
Morgan, William Douglas. WO 2009/017957 A1. 5 Feb. 2009.
Morren, John E. U.S. Pat. No. 3,428,660 A. 20 Jan. 1964.
Neiss, Oskar. U.S. Pat. No. 2,033,732 A. 27 Aug. 1934.
Phillips, C. Frank, U.S. Pat. No. 4,100,181. 11 Jul. 1978.
Reaney, Martin J. T. Patent US 2002009785A1. 24 Jan. 2002.
Red, Jerry F. P., et al., U.S. Pat. No. 4,118,407. 3 Oct. 1978.
Santos, Regiane Ribeiro Dos, et al., *Journal of Food and Nutrition Research JFNR* 2.9 (2014): 561-66.
Shelley, Arthur, et al., Patent US20050255174 A1. 17 Nov. 2005.
"Sodium Bicarbonate." *BicarZ*. Solvay, n.d. Web. 14 Apr. 2015. <http://www.bicarz.com/en/sodium-bicarbonate/bicar-z-properties/buffer-effect/index.html>.
Sutterlin, William Rusty, et al., Patent WO 2016100944A2. 18 Dec. 2015.
United States. Department of Agriculture. National Organic Program. *Tall Oil—Crop Production*. 2010.
Watanabe, Yomi, et al., *Journal of the American Oil Chemists' Society J Am Oil Chem Soc* 84.11 (2007): 1015-021.
Woerfel, J. B. "Processing and Utilization of By-products from Soy Oil Processing." *J Am Oil Chem Soc Journal of the American Oil Chemists' Society* 58.3 (1981): 188-91.

Woerfel, J. B. "Alternatives for Processing of Soapstock." *J Am Oil Chem Soc Journal of the American Oil Chemists' Society* 60.2 (1983): 310-13.

Zhiyuan, Dai et al. Patent CN 103992883. 20 Aug. 2014.

While the forgoing written description of the invention enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods and examples, but by all embodiments and methods within the scope and spirit of the invention. A number of embodiments of the invention have been described. Nevertheless, it can be understood that various modifications may be made without departing from the spirit and scope of the invention. Accordingly, other embodiments are within the scope of the following claims.

What is claimed is:

1. A method or process for increasing the overall conversion of fatty acid salts or soaps to free fatty acids from a mixed lipid feedstock, the method comprising:
    (a) providing a first reaction mixture comprising an aqueous solution or mixture comprising a mixed lipid feedstock;
    (b) acidifying the mixed lipid feedstock to generate free fatty acids from the fatty acid salts or soaps by a process comprising:
        (1) providing carbon dioxide gas capable of forming carbonic acid when mixed with water; and
        (2) combining or mixing the first reaction mixture with the carbonic acid or the carbon dioxide gas and water to have an acidulation reaction, thereby generating a second reaction mixture comprising free fatty acids,
    wherein the first reaction mixture is combined or mixed with the carbonic acid or the carbon dioxide gas and water for a sufficient amount of time to at least partially acidulate the soaps in the first reaction mixture, thereby generating the second reaction mixture comprising the free fatty acids from the soaps,
    (c) forming and then separating a lipid phase or a lipid component comprising substantially most of the free fatty acids from the second reaction mixture;
    (d) separating by distillation the free fatty acids from the separated lipid phase or lipid component comprising use of a distillation apparatus or device capable of separating the free fatty acids from the separated lipid phase or lipid component; and
    (e) recycling to step (a) and/or (b) at least a portion of the lipid phase or lipid component comprising fatty salts or soaps that is generated after the separating the free fatty acids,
    thereby increasing the overall conversion of soaps to fatty acids and substantially isolating or purifying free fatty acids from a mixed lipid feedstock.

2. The method or process of claim 1, further comprising a thermal hydrolysis reaction for hydrolyzing the mixed lipid feedstock before the acidifying reaction of step (b),
    wherein the thermal hydrolysis reaction comprises:
    heating and pressurizing the aqueous solution or mixture comprising the mixed lipid feedstock under conditions comprising sufficient pressure and temperature to generate a first reaction mixture comprising a free fatty acid and/or a soap (a fatty acid salt), and/or a glyceride,
    wherein the thermal hydrolysis reaction is carried out under conditions comprising:
        a temperature in the range of between about 10° C. to about 700° C., or about 20° C. to about 600° C., or about 50° C. to about 500° C.,
        a pressure of between about 300 to about 2000 psig (about 20.7 bar to about 137.9 bar) or a pressure of between about 0 to about 2500 psig, and
        reacting for between about 1 second (sec) to about 3000 minutes (min), or between about 1 min to about 300 min, or between about 5 min to 200 min.

3. The method or process of claim 1, further comprising a lipase reaction for hydrolyzing the mixed lipid feedstock before the acidifying reaction of step (b),
    wherein the lipase reaction comprises:
    heating and pressurizing the aqueous solution or mixture comprising the mixed lipid feedstock under conditions comprising sufficient pressure and temperature to generate a first reaction mixture comprising a free fatty acid and/or a soap (a fatty acid salt), and/or a glyceride,
    wherein the lipase reaction is carried out under conditions comprising:
        a temperature in the range of between about 10° C. to about 700° C., or about 20° C. to about 600° C., or about 50° C. to about 500° C.,
        a pressure of between about 300 to about 2000 psig (about 20.7 bar to about 137.9 bar) or a pressure of between about 0 to about 2500 psig, and
        reacting for between about 1 second (sec) to about 24 days, or between about 1 min to about 7 days, or between about 5 min to 1 day.

4. The method or process of claim 1, wherein the mixed lipid feedstock comprises a saponifiable material, and the saponifiable material is subjected to a saponification reaction before the acidifying reaction.

5. The method or process of claim 1, wherein:
    (a) the apparatus or device comprises a distillation unit, apparatus or device or equivalent,
    (b) the distillation unit, apparatus or device or equivalent for separating the free fatty acids from the separated lipid phase or lipid component comprises a distillation column, a flash vessel, an evaporative unit, a crystallizer, or a chromatography unit,
    (c) the separating of the free fatty acids from the separated lipid phase or lipid component using the apparatus capable of distillation or equivalent results in removing about 70%, 75%, 80%, 85%, 90%, 95%, 98%, 99% or more of the free fatty acids,
    (d) the fatty acids recovered from the apparatus or device capable of separating the free fatty acids from the separated lipid phase or lipid component in step (d) undergo one or a plurality of additional processing steps, wherein optionally the additional processing steps comprise fractional distillation, crystallization, adsorption or chromatography,
    (e) water in the lipid phase is substantially removed prior to entering the apparatus or device capable of separating the free fatty acids from the separated lipid phase or lipid component in step (d), and optionally water in the lipid phase is removed inside of the same apparatus or device that removes the fatty acids, or
    (f) the methods further comprise additional evaporative steps or measures to recover volatile components comprising residual fatty acids or monoglycerides to increase overall recovery of total fatty matter.

6. The method or process of claim 1, further comprising:
    reacting the fatty acids recovered in step (d) with an alcohol or alcohols to form a reaction mixture comprising fatty acid alkyl esters and/or glycerides.

7. The method or process of claim 6, further comprising: separating, isolating, and/or purifying the fatty acids and/or the fatty acid alkyl esters into separate fractions.

8. The method or process of claim 1, wherein the acidifying of step (b) comprises:
(1)
(i) providing an acid or an acid solution or a gas capable of forming an acid when mixed with water; and
(ii) combining or mixing the mixed lipid feedstock with the acid or acid solution or the gas or mixing the mixed lipid feedstock with the acid or acid solution or the gas to have an acidulation reaction and to generate a pre-treated mixed lipid feedstock, wherein the mixed lipid feedstock is combined or mixed with the acid or acid solution or the gas for a sufficient amount of time to acidulate a soap in the mixed lipid feedstock; or
(2) electrolysis of the mixed lipid feedstock for a sufficient amount of time to acidulate soap in the mixed lipid feedstock.

9. The method or process of claim 1, wherein the mixed lipid feedstock comprises a natural oil or crude natural oil comprising a vegetable oil.

10. The method or process of claim 1, wherein the mixed lipid feedstock further comprises additional water, a phospholipid and/or an unsaponifiable material.

11. The method or process of claim 2, wherein the heating and pressurizing of the mixed lipid feedstock is done in a single vessel, or sequential, different, reaction vessels.

12. The method or process of claim 1, wherein:
(a) the mixed lipid feedstock is obtained from a process comprising alkaline neutralization of a crude natural oil; or
(b) the mixed lipid feedstock comprises, or further comprises, one or more compounds produced as a byproduct from a process comprising water washing of a crude biodiesel.

13. The method or process of claim 2, wherein the heating and pressurizing the mixed lipid feedstock takes place in conditions comprising: temperature in a range of between about 100° C. to 500° C.; and/or a pressure of between about 650 and 1800 psig; and/or for between about 20 and 30 minutes, or between about 160 and 180 minutes.

14. The method or process of claim 1, wherein the amount of gas is sufficient to increase pressure in the first reaction mixture in which the acidifying reaction is being carried out to between about 10 and 1000 psig.

15. The method or process of claim 1, wherein the acidifying reaction is carried out at a temperature in the range of between about 5° C. to about 400° C.

16. The method or process of claim 1, wherein:
(a) after a reaction vessel has reached a desired temperature and pressure to carry out the acidulation step, a resulting reaction mixture is agitated, or otherwise mixed in order to maximize the contacting of the soaps with the acid;
(b) after the acidulation reaction contents of the acidulation reaction are allowed to settle or partition allowing for the formation or separation of a lipid layer, a lipid phase or a lipid component, and an aqueous layer, an aqueous phase or an aqueous component, wherein the lipid layer or lipid phase floats on the top of the aqueous layer
(c) the method or process further comprises multiple acidulation reactions;
(d) the acidulation reaction is carried out in a reaction vessel, and the method or process further comprises depressurizing the reaction vessel after the acidulation reaction, and allowing for dissolved carbonic acid or other gaseous acid to separate out of the solution as gaseous $CO_2$, or equivalents;
(e) the lipid layer or lipid phase or component, is transferred to an electrolysis unit, wherein the lipid layer or lipid phase or component is reacted with an anolyte such that the unreacted soaps generate free fatty acids;
(f) the lipid layer or lipid phase or component is transferred to an electrolysis unit comprising a vessel or suitable container comprising an anode and a vessel or other suitable container comprising a cathode;
(g) the aqueous phase or component, or multiple aqueous phases if collected from multiple acidulation reactions, is treated to remove water;
(h) the aqueous phase or component, or multiple aqueous phases if collected from multiple acidulation reactions, is treated using a filtration, or each acidulation reaction if more than one acidulation reaction, is treated immediately after or during the point at which the aqueous phase is separated from the lipid phase;
(i) the aqueous phase or component, or multiple aqueous phases if collected from multiple acidulation reactions, is treated with calcium hydroxide;
(j) the aqueous phase or component, or multiple aqueous phases if collected from multiple acidulation reactions, is subjected to electrolysis to recover monovalent ions as a base for a value added product, wherein electrical current is passed through a cathode, the water is reduced, thereby generating hydroxide ions; and as monovalent ions are pushed across a membrane separating an anode vessel from a cathode vessel into the cathode vessel, they react with the generated hydroxide ions to generate a corresponding hydroxide base;
(k) the mixed lipid feedstock is pretreated by one or more reagents; or
(l) the method or process is a batch, a semi-batch and/or a continuous method or process.

17. A method for the manufacture of a renewable diesel and/or biodiesel and/or oleochemicals comprising use of a method or process claim 1.

18. The method of claim 1, wherein the mixed lipid feedstock comprises: a triglyceride; a saponifiable material; a gums product; a crude biodiesel; a fatty acid; a fat splitter emulsion; or, any combination thereof.

19. The method of claim 18, wherein the saponifiable material comprises any of: a glyceride, a phospholipid, a tall oil, a soapstock or a combination thereof.

20. The method of claim 18, wherein the fatty acid is derived from a distillation bottom.

21. The method of claim 18, wherein the fat splitter emulsion is purged from a fat splitter due to accumulation when recycled.

22. The method of claim 18, wherein the gums product comprises a chemically or an enzymatically derived gums product.

23. The method of claim 18, wherein the mixed lipid feedstock comprises a wash-water comprising soaps or a combination thereof generated during the chemical refining of a crude natural oil.

24. The method of claim 18, wherein the mixed lipid feedstock comprises a mixture of fatty acid soaps, fatty acids or fatty acid soaps and fatty acids generated via a fermentation process or a reaction.

25. The method of claim 18, wherein the mixed lipid feedstock comprises or is derived from a biological source.

26. The method of claim 25, wherein the biological source comprises or is derived from a plant, an animal source, an agricultural product, a waste-product, a microorganism or a combination thereof.

27. The method of claim 26, wherein the microorganism comprises or is derived an algae, a kelp or a yeast.

28. The method of claim 18, wherein the mixed lipid feedstock is derived from enzymatic degumming of edible and inedible oils.

29. The method of claim 18, wherein the mixed lipid feedstock is pretreated.

30. The method of claim 1, wherein the amount of the gas added is sufficient to increase reaction mixture pressure in a reaction vessel in which the acidulation reaction is being carried out to between about 0 and about 5000 psig.

31. The method of claim 1, wherein a solvent is added to the acidulation reaction in an amount of between about 0.01:1 solvent-to-total dissolved solids (TDS) present in the mixed lipid feedstock to about 100:1 TDS.

32. The method of claim 2, wherein the thermal hydrolysis reaction comprises use of one or more reagents capable of generating acids once hydrolyzed.

33. The method of claim 31, wherein the reagent is or comprises a saccharide.

34. The method or process of claim 2, wherein:
(a) a solvent is added to the thermal hydrolysis reaction;
(b) the solvent of step (a) comprises a polar solvent;
(c) the thermal hydrolysis reaction and the acidulation reaction take place sequentially; or,
(d) the thermal hydrolysis reaction and the acidulation reaction can take place simultaneously as a "one pot" reaction in one reaction vessel.

* * * * *

UNITED STATES PATENT AND TRADEMARK OFFICE
CERTIFICATE OF CORRECTION

PATENT NO. : 10,975,328 B2
APPLICATION NO. : 16/816167
DATED : April 13, 2021
INVENTOR(S) : Long et al.

It is certified that error appears in the above-identified patent and that said Letters Patent is hereby corrected as shown below:

In the Claims

In Column 40, Lines 8-9, please delete "33. The method of claim 31, wherein the reagent is or comprises a saccharide." and replace with "33. The method of claim 32, wherein the reagent is or comprises a saccharide."

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*